US011032859B2

(12) United States Patent
Min et al.

(10) Patent No.: US 11,032,859 B2
(45) Date of Patent: Jun. 8, 2021

(54) ELECTRONIC DEVICE FOR CONTROLLING DATA COMMUNICATION OF EXTERNAL ELECTRONIC DEVICE AND COMMUNICATION SYSTEM

(71) Applicant: Samsung Electronics Co., Ltd, Suwon-si (KR)

(72) Inventors: Hyun-Kee Min, Sangju-si (KR); Sung-Hee Lee, Suwon-si (KR); Tae-Hun Lim, Gwacheon-si (KR); Min-Whoa Hong, Suwon-si (KR); Sun-Key Lee, Seongnam-si (KR); Doo-Suk Kang, Suwon-si (KR); Bo-Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 16/163,291

(22) Filed: Oct. 17, 2018

(65) Prior Publication Data

US 2019/0116627 A1  Apr. 18, 2019

(30) Foreign Application Priority Data

Oct. 17, 2017 (KR) .......................... 10-2017-0134790

(51) Int. Cl.
*H04W 76/14* (2018.01)
*H04W 64/00* (2009.01)
*H04W 16/14* (2009.01)

(52) U.S. Cl.
CPC ........... *H04W 76/14* (2018.02); *H04W 64/00* (2013.01); *H04W 16/14* (2013.01)

(58) Field of Classification Search
CPC combination set(s) only.
See application file for complete search history.

(56) References Cited

U.S. PATENT DOCUMENTS 10,028,318 B2   7/2018  Cho et al.
2011/0026474 A1*  2/2011  Freda ...................... H04K 1/10
                                                            370/329

(Continued)

FOREIGN PATENT DOCUMENTS

KR   10-2011-0050340 A   5/2011
KR   10-2016-0043443 A   4/2016
WO      2017/051961 A1   3/2017

OTHER PUBLICATIONS

International Search Report dated Jan. 7, 2019 in connection with International Patent Application No. PCT/KR2018/012219, 4 pages.

(Continued)

*Primary Examiner* — Yee F Lam

(57) ABSTRACT

An electronic device may include a network interface, a wireless communication circuit configured to support directional communication, a processor electrically connected with the network interface and the wireless communication circuit, and a memory electrically connected with the processor. The memory may store instructions executed to enable the processor to form a first wireless communication channel with a first external electronic device using the wireless communication circuit, form a second wireless communication channel with a second external electronic device using the wireless communication circuit, determine information associated with positions of the first external electronic device and the second external electronic device, detect communication, via the electronic device, between the first external electronic device and the second external electronic device, and enable the first external electronic device and the second external electronic device to directly connect to each other in the frequency band at least partially based on the information.

15 Claims, 17 Drawing Sheets

(56) References Cited

U.S. PATENT DOCUMENTS

| | | | | |
|---|---|---|---|---|
| 2013/0288645 | A1* | 10/2013 | Zheng | H04W 76/14 455/411 |
| 2014/0056220 | A1* | 2/2014 | Poitau | H04W 76/14 370/328 |
| 2015/0057016 | A1 | 2/2015 | Moshfeghi | |
| 2015/0119022 | A1* | 4/2015 | Saito | H04W 64/00 455/426.1 |
| 2015/0373730 | A1* | 12/2015 | Fujishiro | H04L 1/0025 455/450 |
| 2016/0150459 | A1 | 5/2016 | Patil et al. | |
| 2016/0183044 | A1* | 6/2016 | Wei | H04W 8/005 455/456.1 |
| 2016/0205501 | A1* | 7/2016 | Lee | H04W 8/005 455/457 |
| 2016/0278153 | A1* | 9/2016 | Kim | H04W 4/023 |
| 2016/0337809 | A1* | 11/2016 | Narasimha | H04W 4/023 |
| 2017/0034842 | A1* | 2/2017 | Xu | H04W 4/80 |
| 2017/0181154 | A1* | 6/2017 | Zhou | H04W 72/048 |
| 2017/0195893 | A1* | 7/2017 | Lee | H04L 5/006 |
| 2017/0196034 | A1 | 7/2017 | Jung et al. | |
| 2017/0223713 | A1* | 8/2017 | Chang | H04W 72/082 |
| 2018/0116005 | A1* | 4/2018 | Ravuvari | H04W 36/0055 |
| 2018/0331935 | A1* | 11/2018 | Ross | H04L 43/16 |
| 2019/0045569 | A1* | 2/2019 | Abedini | H04W 72/0473 |
| 2019/0200339 | A1* | 6/2019 | Handle | G01S 5/0273 |
| 2019/0223066 | A1* | 7/2019 | Xu | H04W 36/0058 |
| 2020/0015298 | A1* | 1/2020 | Chae | H04W 76/14 |
| 2020/0120458 | A1* | 4/2020 | Aldana | H04W 28/22 |

OTHER PUBLICATIONS

Written Opinion of the International Searching Authority dated Jan. 7, 2019 in connection with International Patent Application No. PCT/KR2018/012219, 6 pages.

* cited by examiner

| FREQUENCY / DISTANCE | 2.4 GHz | | 5 GHz | | | | 60 GHz | |
|---|---|---|---|---|---|---|---|---|
| | 20 MHz | 40 MHz | 20 MHz | 40 MHz | 80 MHz | 160 MHz | 1 channel | 1 channel bonding |
| 0~10m | rate1 | rate2 | rate3 | rate4 | rate5 | rate6 | rate7 | rate8 |
| 10~20m | rate9 | rate10 | rate11 | rate12 | rate13 | rate14 | rate15 | rate16 |
| 20~30m | rate17 | rate18 | rate19 | rate20 | rate21 | rate22 | rate23 | rate24 |
| ⋮ | ⋮ | ⋮ | ⋮ | ⋮ | ⋮ | ⋮ | ⋮ | ⋮ |

FIG.10

ELECTRONIC DEVICE FOR CONTROLLING DATA COMMUNICATION OF EXTERNAL ELECTRONIC DEVICE AND COMMUNICATION SYSTEM

CROSS-REFERENCE TO RELATED APPLICATION AND CLAIM OF PRIORITY

This application is based on and claims priority under 35 U.S.C. § 119 to Korean Patent Application No. 10-2017-0134790 filed on Oct. 17, 2017 in the Korean Intellectual Property Office, the disclosure of which is incorporated herein by reference in its entirety.

BACKGROUND

1. Field

Various embodiments of the disclosure relate to electronic devices for controlling data communication of external electronic devices and communication systems.

2. Description of Related Art

The growth of wireless communication technology leads to enhanced data rates. Various electronic devices are being developed using wireless communication techniques.

mmWave-based ultra-high wireless transmission technology has recently been standardized. mmWave system may typically mean a system adopting an ultra-high frequency ranging 30 GHz to 300 GHz. mmWave systems may employ IEEE 802.11ad, supporting a wireless transmission speed of a few Gbps in an unlicensed frequency band (e.g., 60 GHz). This technology is a short-range wireless communication scheme that enables Gbps-class, ultra-high speed wireless transmission of ultra-high definition videos on a broad band reaching a few GHz.

mmWave systems, adopting ultra-high frequencies ranging from 30 GHz to 300 GHz, may be subject to increased rectilinear propagation, and serious propagation losses, resulting in poor propagation properties. Ultra-high frequency systems may secure their transmission distance by collecting and sending out radio wave energy using beamforming.

The above information is presented as background information only to assist with an understanding of the disclosure. No determination has been made, and no assertion is made, as to whether any of the above might be applicable as prior art with regard to the disclosure.

SUMMARY

In a wireless communication environment with multiple access points (APs) deployed, the data transmission speed of an electronic device may be varied depending on which one of the APs or what frequency band the electronic device is to adopt. However, the electronic device would be unaware of the AP or frequency band that may deliver the optimum data transmission speed.

According to an embodiment, an electronic device (e.g., an AP or a server) may control data communication of an external electronic device. According to an embodiment, the electronic device may control data transmission between a first external electronic device and a second external electronic device based on information related to the positions of a plurality of APs, the first external electronic device, and the second external electronic device. For example, the electronic device may perform control so that the first external electronic device and the second external electronic device connected to at least one AP may directly connect to each other.

According to an embodiment, the electronic device may control data transmission between the first external electronic device and the second external electronic device considering, e.g., the distance between the first external electronic device and the second external electronic device or data transmission rates as per frequency bands supported.

According to an embodiment, an electronic device may comprise a network interface connected to an internet, a wireless communication circuit configured to support directional communication in a frequency band between 20 GHz to 100 GHz, a processor electrically connected with the network interface and the wireless communication circuit, and a memory electrically connected with the processor, wherein the memory may store instructions executed to enable the processor to form a first wireless communication channel with a first external electronic device using the wireless communication circuit, form a second wireless communication channel with a second external electronic device using the wireless communication circuit, determine information associated with positions of the first external electronic device and the second external electronic device, detect communication, via the electronic device, between the first external electronic device and the second external electronic device, and enable the first external electronic device and the second external electronic device to directly connect to each other in the frequency band at least partially based on the information.

According to an embodiment, there may be provided a system including a plurality of access points (APs), each of the plurality of APs comprising a network interface connected to an internet, a wireless communication circuit configured to support directional communication in a frequency band between 20 GHz to 100 GHz, a processor electrically connected with the network interface and the wireless communication circuit, and a memory electrically connected with the processor, wherein the memories of the APs may store instructions executed to enable the processors of the APs to form a first wireless communication channel with a first external electronic device using the wireless communication circuit, form a second wireless communication channel with a second external electronic device using the wireless communication circuit, determine information associated with positions of the first external electronic device and the second external electronic device, detect communication, via at least one of the APs, between the first external electronic device and the second external electronic device, and enable the first external electronic device and the second external electronic device to directly connect to each other using the frequency band at least partially based on the information.

According to an embodiment, an electronic device may comprise a wireless communication circuit, a processor electrically connected with the wireless communication circuit, and a memory electrically connected with the processor, wherein the memory may store instructions executed to enable the processor to form a first wireless communication channel with an AP including a network interface connected to an internet using the wireless communication circuit, the AP configured to form a second wireless communication channel with an external electronic device, receive location information about the external electronic device from the AP, and enable direct connection to the external electronic device using the wireless communication circuit, based on the received location information about the external electronic device.

Other aspects, advantages, and salient features of the disclosure will become apparent to those skilled in the art from the following detailed description, which, taken in conjunction with the annexed drawings, discloses embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 10 is a view illustrating an example of a data transmission rate table as per distances and frequency bands according to an embodiment;

Throughout the drawings, like reference numerals will be understood to refer to like parts, components, and structures.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
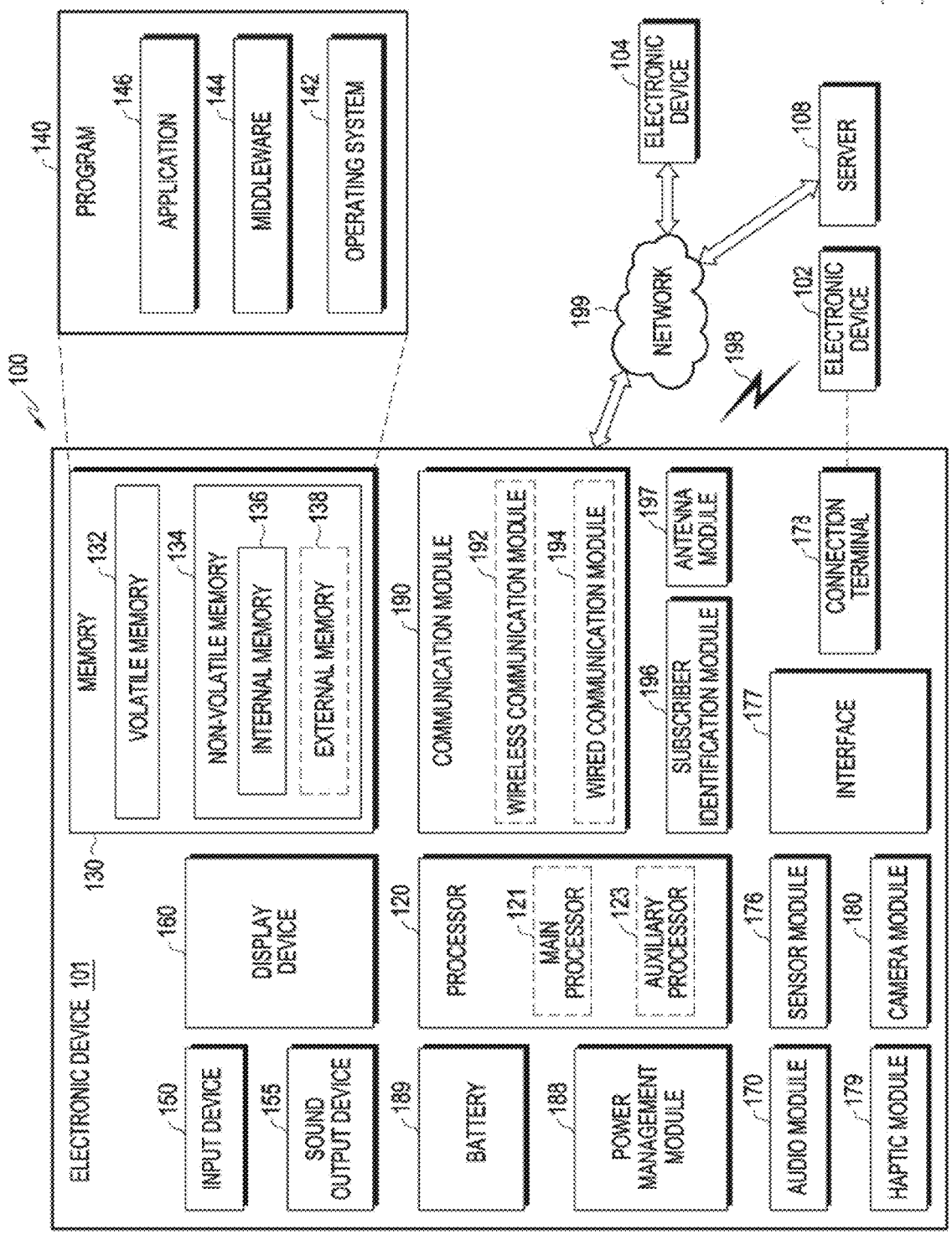
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device (160) (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The memory 130 may store instructions executed to enable the processor 120 to form a first wireless communication channel with an electronic device (e.g., an AP) including a network interface connected to an internet using the wireless communication circuit 192, the AP configured to form a second wireless communication channel with an external electronic device (not shown), receive location information about the external electronic device from the AP, and enable direct connection to the external electronic device using the wireless communication circuit 192, based on the received location information about the external electronic device.

According to an embodiment, the wireless communication circuit may support directional communication of a 60 GHz frequency band, and the processor 120 may directly transmit data to the external electronic device as per the 60 GHz frequency band.

The input device 150 may be a device for receiving a command or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

The connection terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as bluetooth, wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a singe chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., commands or data) therebetween.

According to an embodiment, commands or data may be transmitted or received between the electronic device 101 and the external electronic device 104 via the server 108 coupled with the second network 199. The first and second external electronic devices 102 and 104 each may be a device of the same or a different type from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device receiving the request may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

According to an embodiment, an electronic device 101 may comprise a wireless communication circuit (e.g., the wireless communication module 192), a processor 120 electrically connected with the wireless communication circuit 192, and a memory 130 electrically connected with the processor 120, wherein the memory 130 may store instructions executed to enable the processor 120 to form a first wireless communication channel with an AP including a network interface connected to an internet using the wireless communication circuit, the AP configured to form a second wireless communication channel with an external electronic device, receive location information about the external electronic device from the AP, and enable direct connection to the external electronic device using the wireless communication circuit, based on the received location information about the external electronic device.

According to an embodiment, the wireless communication circuit 192 may be configured to support directional communication of a 60 GHz frequency band, and the instructions are executed to enable the processor 120 to establish direct connection to the external electronic device using the 60 GHz frequency band.

Figure 2:
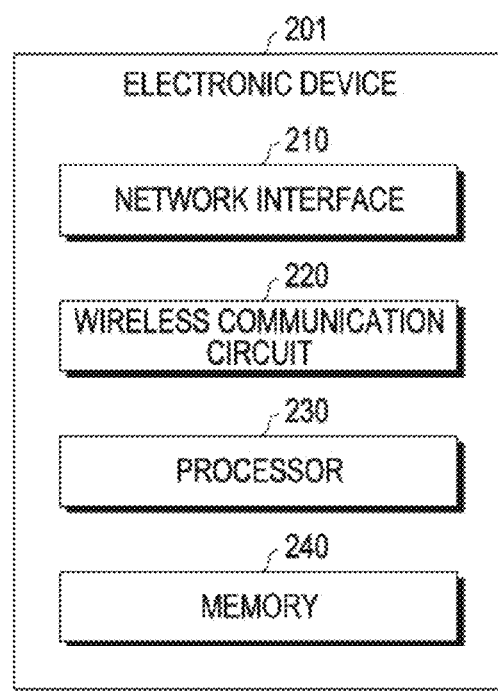
FIG. 2 is a block diagram illustrating an electronic device according to an embodiment.

FIG. 2 is a block diagram illustrating an electronic device 201 (e.g., the electronic device 101) according to an embodiment. Referring to FIG. 2, according to an embodiment, the electronic device 201 may include a network interface 210 (e.g., the interface 177), a wireless communication circuit 220 (e.g., the wireless communication module 192), a processor 230 (e.g., the processor 120), and a memory 240 (e.g., the memory 130). For example, the electronic device 201 may be implemented as an AP (e.g., the electronic device 301, 302, or 303 of FIG. 3) or a server (e.g., the server 108 of FIG. 1).

The network interface 210 may connect to the internet to allow the electronic device 201 to perform data communication with another electronic device (e.g., the electronic device 102 or the electronic device 104) or the server (e.g., the server 108).

The wireless communication circuit 220 (e.g., the wireless communication module 190) may support wireless communication in a particular frequency band. For example, the wireless communication circuit 220 may support directional communication in a frequency band ranging 20 GHz to 100 GHz. It is apparent that the wireless communication circuit 220 may support other various frequency bands according to embodiments. According to an embodiment, where the wireless communication circuit 220 supports wireless communication corresponding to multiple frequency bands, the wireless communication circuit 220 may have wireless communication circuits and antennas corresponding to the frequency bands. For example, the wireless communication circuit 220 may have a first circuit and a first antenna to perform 2.5 GHz or 5 GHz wireless communication and may further include a second circuit and a second antenna to perform 60 GHz wireless communication. According to an embodiment, the wireless communication circuit 220 may be designed to physically have a single circuit and a single antenna to perform wireless communication in various frequency bands.

The processor 230 may form a first wireless communication channel with a first external electronic device using the wireless communication circuit 220 and a second wireless communication channel with a second external electronic device using the wireless communication circuit 220. According to an embodiment, the processor 230 may determine relative positions based on information associated with the first external electronic device and the second external electronic device. For example, the processor 230 may obtain the distance and direction to the first external electronic device from the electronic device 201 and the distance and direction to the second external electronic device from the electronic device 201 and may determine information associated with the positions of the first external electronic device and the second external electronic device. Various embodiments in which the electronic device 201 determines the information associated with the positions of the external electronic devices are described below in detail with reference to, e.g., FIGS. 6A and 6B.

The processor 230 may detect communication via the electronic device 201 between the first external electronic device and the second external electronic device and may enable the first external electronic device and the second external electronic device to directly connect to each other in the frequency band based on at least part of the information associated with the positions of the first external electronic device and the second external electronic device. According to an embodiment, the processor 230 may enable the first external electronic device and the second external electronic device to directly connect together using a 60 GHz frequency band. According to an embodiment, the processor 230 may enable the first external electronic device to connect to the second external electronic device using another electronic device (e.g., another AP) depending on whether the 60 GHz frequency band is supported. According to an embodiment, the processor 230 may enable the first external electronic device to connect to the second external electronic device using the electronic device 201 supporting data transmission through the 60 GHz frequency band. According to an embodiment, the processor 230 may identify a wireless communication frequency band supported by the first and second external electronic devices, identify whether the distance between the first and second external electronic devices is within a threshold determined for the 60 GHz frequency band, and identify whether direct data transmission is possible between the first and second external electronic devices. According to an embodiment, the processor 230 may perform control to estimate a data transmission rate upon transmitting data using the electronic device 201, a data transmission rate when the first and second external electronic devices directly transmit data, or a data transmission rate upon transmitting data using another electronic device (e.g., a second AP) in data transmission between the first and second external electronic devices, select the highest data transmission rate, and transmit data between the first and second external electronic devices. For example, to compare various data transmission rates, the processor 230 may consider various variables that may influence the data transmission speed, such as the distance between the first and second external electronic devices and the electronic device 201 or the other electronic device (e.g., the second AP), data transmission rates as per distances and frequency bands, or channel utilization for frequency bands.

60 GHz frequency band wireless data communication, by the rectilinear propagation of wireless waves, may be impossible when an obstacle is present on the straight line path. For example, even where the first and second external electronic devices both support the 60 GHz frequency band, and the first and second external electronic devices are positioned sufficiently close to each other, if there is an object on the straight line path between the two devices, the processor 230 may perform control so that the first and second external electronic devices may perform data communication via the electronic device 201, but not directly. According to an embodiment, the processor 230 may identify whether there is an obstacle that may affect data transmission between the first and second external electronic devices, and if any, the processor 230 may control data transmission while avoiding the obstacle. For example, where a human being is discovered from on the straight line path between the first and second external electronic devices, direct wireless communication on the 60 GHz frequency band may be difficult to perform. Thus, the processor 230 may control the first and second external electronic devices to transmit data using the electronic device 201. For example, the electronic device 201 may control the first and second external electronic devices to directly transmit data in a 5 GHz frequency band.

Figure 7:
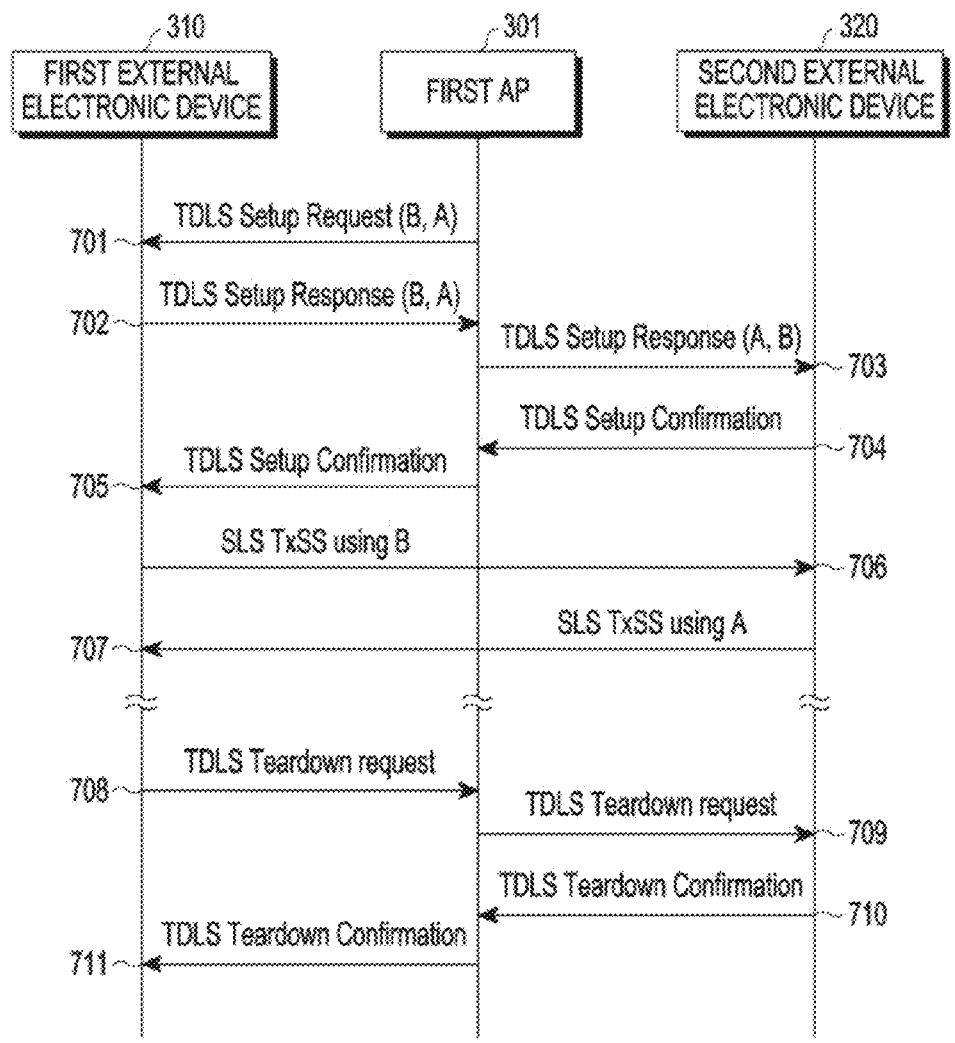
FIG. 7 is a sequence diagram illustrating an example of controlling, by an electronic device, direct data communication between the electronic device and an external electronic device according to an embodiment.

According to an embodiment, the processor 230 may transmit, to the first and second external electronic devices, data packets containing location information about each of the first and second external electronic devices to control direct data communication between the two devices. For example, the processor 230 may control direct data communication by transferring distance and direction information about the first external electronic device or second external electronic device to the first external electronic device or the second external electronic device using a base station system (BSS) transition management (BTM) frame or an action frame. The first and second external electronic devices each may perform 60 GHz frequency band wireless communication based on the received distance and direction information about its opposite device. Now described below in detail with reference to FIG. 7 is an embodiment in which the processor 230 controls data communication between external electronic devices.

According to an embodiment, an electronic device 201 may comprise a network interface 210 connected to an internet, a wireless communication circuit 220 configured to support directional communication in a frequency band between 20 GHz to 100 GHz, a processor 230 electrically connected with the network interface 210 and the wireless communication circuit 220, and a memory 240 electrically connected with the processor 230, wherein the memory 240 may store instructions executed to enable the processor 230 to form a first wireless communication channel with a first external electronic device (e.g., the electronic device 102 of FIG. 1) using the wireless communication circuit 220, form a second wireless communication channel with a second external electronic device (e.g., the electronic device 104 of FIG. 1) using the wireless communication circuit 220, determine information associated with positions of the first external electronic device 102 and the second external electronic device 104, detect communication, via the electronic device 201, between the first external electronic device 102 and the second external electronic device 104, and enable the first external electronic device 102 and the second external electronic device 104 to directly connect to each other in the frequency band at least partially based on the information.

According to an embodiment, the information associated with the positions of the first external electronic device 102 and the second external electronic device 104 may include a direction and a distance with respect to the electronic device 201.

According to an embodiment, the processor 203 may determine a distance between the first external electronic device 102 and the second external electronic device 104 and enable the first external electronic device 102 and the second external electronic device 104 to directly connect to each other at least partially based on the distance.

According to an embodiment, the frequency band may include 60 GHz.

According to an embodiment, the processor 203 may control the first external electronic device 102 to transmit data to the second external electronic device 104 via the electronic device 201 or another electronic device (not shown).

According to an embodiment, the processor 203 may control data communication between the first external electronic device 102 and the second external electronic device 104 based on a data transmission rate as per a distance and a bandwidth.

According to an embodiment, the processor 203 may control data communication between the first external electronic device 102 and the second external electronic device 104 based on channel utilization of a bandwidth.

According to an embodiment, the processor 203 may control data communication between the first external electronic device 102 and the second external electronic device 104 based on a hop count for the electronic device.

According to an embodiment, the processor 203 may determine another electronic device (not shown) that has a distance sum smaller than a sum of distances between the electronic device 201 and the first external electronic device 102 and between the electronic device 201 and the second external electronic device 104 and control the first external electronic device 102 to transmit data to the second external electronic device 104 via the other electronic device (not shown).

According to an embodiment, the processor 203 may obtain a first distance and a first angle between the electronic device 201 and the first external electronic device 102 using wireless communication of a 60 GHz frequency band, obtain a second distance and a second angle between the electronic device 201 and the second external electronic device 104 using the wireless communication of the 60 GHz frequency band, and determine a distance and an angle between the first external electronic device 102 and the second external electronic device 104 based on the first distance, the second distance, the first angle, and the second angle.

According to an embodiment, the processor 203 may identify at least one obstacle disturbing direct connection between the first external electronic device 102 and the second external electronic device on 104 a straight line path between the first external electronic device 102 and the second external electronic device 104 and control data communication between the first external electronic device 102 and the second external electronic device 104 considering the at least one obstacle.

According to an embodiment, the processor 203 may allow the first external electronic device 102 and the second external electronic device 104 to directly connect to each other when there is not the at least one obstacle.

According to an embodiment, the processor 203 may identify whether the at least one obstacle is discovered on the straight line path between the first external electronic device 102 and the second external electronic device 104 at a predetermined cycle while the first external electronic device 102 and the second external electronic device 104 are directly connected to each other.

Figure 3:
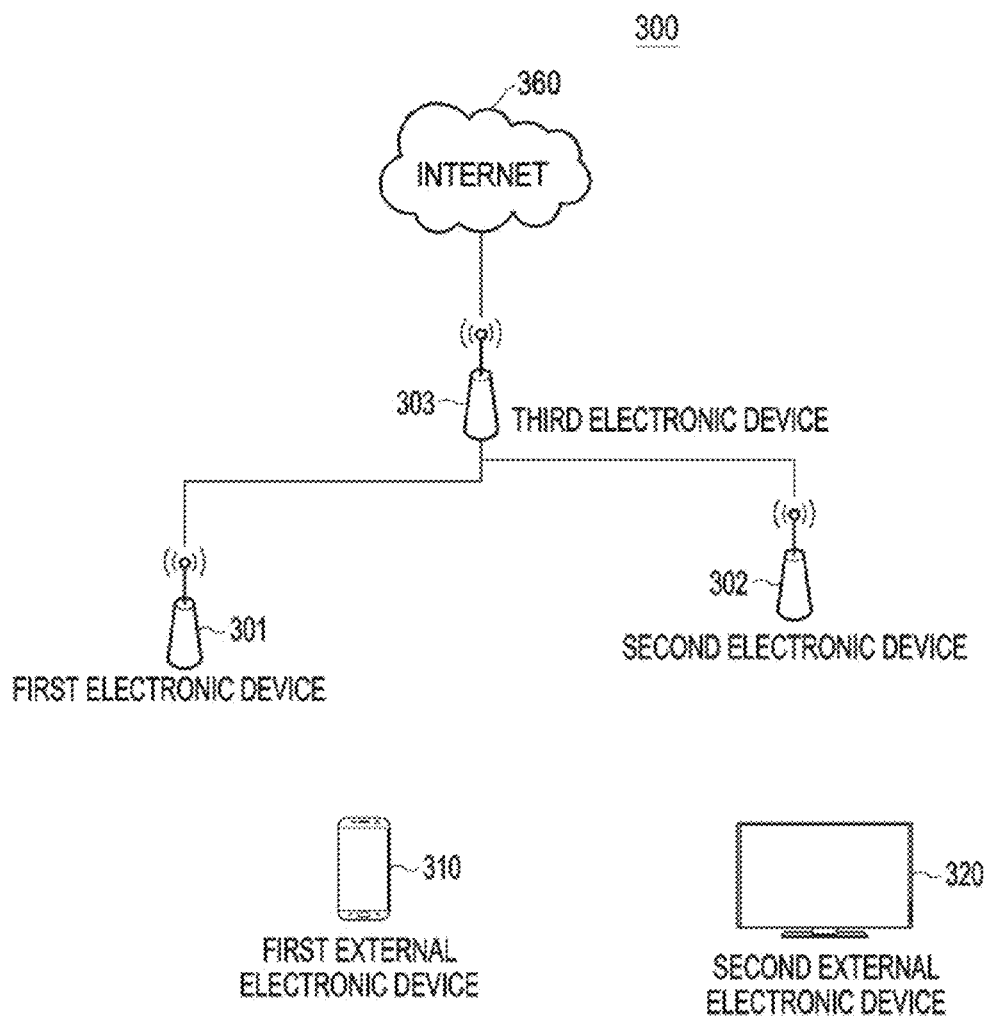
FIG. 3 is a view illustrating an example of a circumstance in which an electronic device controls data communication of an external electronic device according to an embodiment.

FIG. 3 is a view illustrating an example of a circumstance in which an electronic device controls data communication of an external electronic device according to an embodiment. FIG. 3 illustrates a network environment in which there co-exist electronic devices (e.g., a first electronic device 301, a second electronic device 302, and a third electronic device 303) that serve as multiple APs and external electronic devices (e.g., a first external electronic device 310 and a second external electronic device 320) in an IEEE 802.11ad-based system or a system supporting both 802.11 WLAN and 802.11ad 60 GHz communication. For example, the network environment of FIG. 3 may be referred to as a service set (SS). According to an embodiment, at least one electronic device (e.g., the first electronic device 301, the second electronic device 302, and the third electronic device 303) included in the SS may detect data communication between the external electronic devices (e.g., the first external electronic device 310 and the second external electronic device 320) belonging to the same SS and may perform control to allow the data communication-detected external electronic devices (e.g., 310 and 320) to perform direct data communication therebetween. As another example, a server (not shown in FIG. 3) (e.g., the electronic device 201 of FIG. 2) in the SS may control data communication for at least one external electronic device (e.g., 310 or 320) in the SS using at least one electronic device (e.g., 301, 302, or 303) in the SS and control direct data connection between the external electronic devices (e.g., 310 and 320) in the SS.

At least one electronic device 301, 302, or 303 of FIG. 3 may include at least some of the components of the electronic device (101 of FIG. 1 or 201 of FIG. 2) (e.g., the processor 120 or the processor 230). The first to third electronic devices 301, 302, and 303 may estimate the distance and angle of the external electronic device 310 or 320 connected thereto. The first electronic device to the third electronic device 301, 302, and 303 may determine the first electronic device to the third electronic device 301, 302, and 303 to be connected upon data communication and the frequency band to be used based on the estimated distance and angle, and whether data communication is necessary between the external electronic devices 310 and 320 connected to the first electronic device to the third electronic device 301, 302, and 303, a data transmission path may be determined. According to an embodiment, the first to third electronic device 301, 302, and 303 may be, e.g., APs or servers. According to an embodiment, the external electronic devices 310 and 320 may be, e.g., portable devices, laptop computers, tablet PCs, or TVs. Any one of the first to third electronic device 301, 302, and 303 may be an AP functioning as a modem or a wireless LAN controller connected to a backend (e.g., the internet 360). For example, as shown in FIG. 3, the third electronic device 303 may function as a modem. According to an embodiment, the first to third electronic device 301, 302, and 303 may be connected to the internet 360.

According to an embodiment, the first external electronic device 310 and the second external electronic device 320 may be connected to the first electronic device 301, and the first electronic device 301 may detect communication, via the first electronic device 301, between the first external electronic device 310 and the second external electronic device 320. The first electronic device 301 may control data communication between the first external electronic device 310 and the second external electronic device 320 based on location-related information about the first external electronic device 310 and the second external electronic device 320. According to an embodiment, the first external electronic device 310 and the second external electronic device 320 may be connected to the second electronic device 302, the second electronic device 302 (e.g., an AP) may detect communication between the first external electronic device 310 and the second external electronic device 320, and data communication between the first external electronic device 310 and the second external electronic device 320 may be controlled based on location-related information about the first external electronic device 310 and the second external electronic device 320. According to an embodiment, the first external electronic device 310 may be connected to the first electronic device 301, and the second external electronic device 320 may be connected to the second electronic device 302. The first electronic device 301 or the second electronic device 302 may detect communication between the first external electronic device 310 and the second external electronic device 320. The first electronic device 301 or the second electronic device 302 may control data communication between the first external electronic device 310 and the second external electronic device 320 based on location-related information about the first external electronic device 310 and the second external electronic device 320.

Each of the plurality of electronic devices 301, 302, and 303 in the SS may identify and store location information about the plurality of electronic devices 301, 302, and 303 in advance, e.g., before controlling data communication for the external electronic devices 310 and 320. For example, the plurality of electronic devices may scan their surroundings or receive information from a device (e.g., a device or server operating as a modem or wireless LAN controller) that has information about all the electronic devices. As another example, a server (not shown) in the SS may control data communication for the plurality of external electronic devices 310 and 320 connected to the plurality of electronic devices 301, 302, and 303. For example, the first electronic device 301 may estimate data transmission rates for when the first external electronic device 310 and the second external electronic device 320 use the plurality of electronic devices 301, 302, and 303 based on the distances between the external electronic devices 310 and 320 and the electronic devices 301, 302, and 303 and may control the first external electronic device 310 and the second external electronic device 320 to transmit data using the electronic device having the highest data transmission rate among the estimated data transmission rates.

According to an embodiment, there may be provided an IEEE 802.11ad-based communication system including a plurality of electronic devices (e.g., APs), in which a first electronic device (e.g., the first electronic device 301) may estimate distances and angles to a plurality of external electronic devices (e.g., portable devices or laptop computers) connected to the first electronic device, and when data communication between the external electronic devices is necessary, calculate the distance and angle between the external electronic devices requiring communication, and determine a data transmission path based on the estimated distance, enhancing the communication speed.

According to an embodiment, where data communication via the internet 360 is necessary for one external electronic device 310 connected to the first electronic device 301, the first electronic device 301 may select a data path estimated to have the highest data transmission rate, considering all of the other electronic devices 302 and 303 in the SS as well as the first electronic device 301 and may control data communication of the external electronic device 310. According to an embodiment, even when a first external electronic device 310 is connected to the first electronic device 301, and a second external electronic device 320 is connected to a second electronic device 302 in the SS, if data communication between the first external electronic device 310 and the second external electronic device 320 is necessary, a data transmission path that may give the optimal data transmission speed between the first external electronic device 310 and the second external electronic device 320 may be selected.

According to an embodiment, there may be provided a system 300 including a plurality of APs (e.g., the first electronic device 301, the second electronic device 302, and the third electronic device 303), each of the plurality of APs 301, 302, and 303 comprising a network interface connected to an internet (e.g., the internet 360), a wireless communication circuit configured to support directional communication in a frequency band between 20 GHz to 100 GHz, a processor electrically connected with the network interface and the wireless communication circuit, and a memory electrically connected with the processor, wherein the memories of the APs 301, 302, and 303 may store instructions executed to enable the processors of the APs 301, 302, and 303 to form a first wireless communication channel with a first external electronic device (e.g., the first external electronic device 310) using the wireless communication circuit, form a second wireless communication channel with a second external electronic device (e.g., the second external electronic device 320) using the wireless communication circuit, determine information associated with positions of the first external electronic device 310 and the second external electronic device 320, detect communication, via at least one of the APs 301, 302, and 303, between the first external electronic device 310 and the second external electronic device 320, and enable the first external electronic device 310 and the second external electronic device 320 to directly connect to each other using the frequency band at least partially based on the information.

According to an embodiment, the information may include a direction and a distance between each of the APs 301, 302, and 303 and the first external electronic device 310 and a direction and a distance between each of the APs 301, 302, and 303 and the second external electronic device 320.

According to an embodiment, the processors of the APs 301, 302, and 303 may determine a distance between the first external electronic device 310 and the second external electronic device 320 and enable the first external electronic device 310 and the second external electronic device 320 to directly connect to each other at least partially based on the distance.

According to an embodiment, the frequency band may include 60 GHz.

According to an embodiment, the processors of the APs 301, 302, and 303 may identify first location information about each of the plurality of APs 301, 302, and 303 with respect to the first external electronic device 310, based on location information about each of the plurality of APs 301, 302, and 303, identify second location information about each of the plurality of APs 301, 302, and 303 with respect to the second external electronic device 320, based on the location information about each of the plurality of APs 301, 302, and 303, select a first AP positioned closest to the first external electronic device 310 and the second external electronic device 320 at least partially based on the first location information and the second location information, and enable the first external electronic device 310 and the second external electronic device 320 to connect to each other via the selected first AP.

Figure 4:
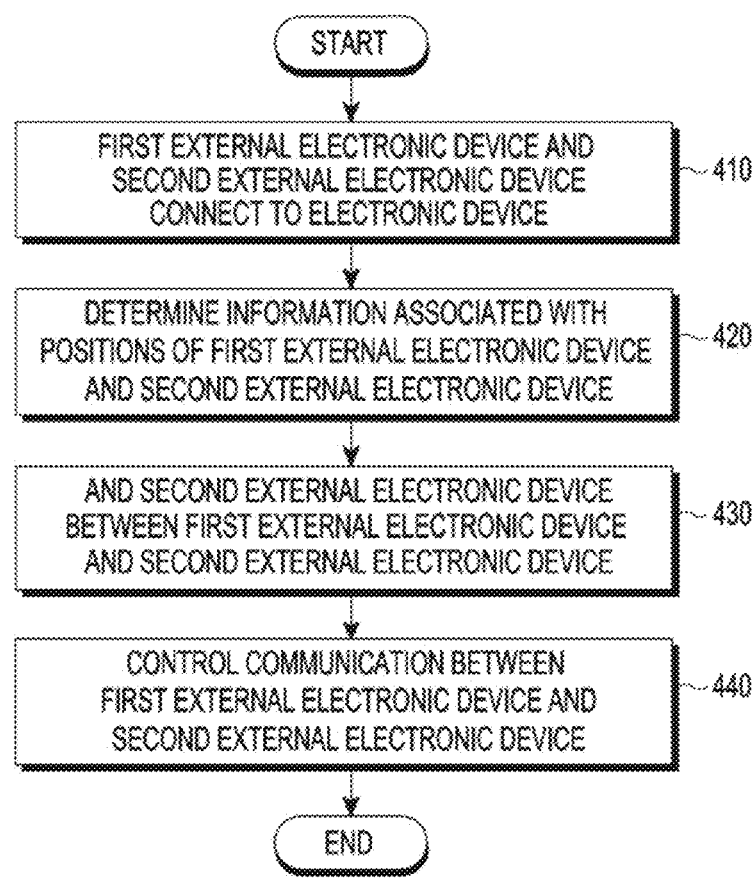
FIG. 4 is a flowchart illustrating a method for controlling, by an electronic device, data communication between external electronic devices according to an embodiment.

FIG. 4 is a flowchart illustrating a method for controlling, by an electronic device (e.g., the electronic device 201 or processor 230 of FIG. 2 or the electronic device 302, 302, or 303 of FIG. 3), data communication between external electronic devices (e.g., the external electronic devices 310 and 320 of FIG. 3) according to an embodiment.

In operation 410, according to an embodiment, a first external electronic device and a second external electronic device may be connected to an electronic device 201. For example, the electronic device 201 may form a first wireless communication channel with the first external electronic device using the wireless communication circuit 220 and form a second wireless communication channel with the second external electronic device using the wireless communication circuit 220.

In operation 420, the processor 230 may determine information associated with positions of the first and second external electronic devices. For example, the position-associated information may include the distance and direction from the electronic device 201 to the first external electronic device and the distance and direction from the electronic device 201 to the second external electronic device. To obtain information associated with the position of the first external electronic device, the processor 230 may identify the line-of-sight (LoS) for the first external electronic device, and where a 60 GHz frequency band wireless communication connection can be established, the processor 230 may establish a wireless communication connection with the first external electronic device as per the 60 GHz frequency band and may obtain the position of the first external electronic device based on the signal strength and beamforming angle between the two devices. The processor 230 may identify the LoS of the first external electronic device, and unless a 60 GHz frequency band wireless communication connection may be established, the processor 230 may receive a data packet from the first external electronic device using a second electronic device (e.g., the electronic device 302 of FIG. 3) and apply triangulation to the electronic device 201, the second electronic device, and the first external electronic device, obtaining the distance between the electronic device 201 and the first external electronic device. In this embodiment, the processor 230 may use location information pre-stored for other electronic devices located in the SS. It is apparent that the processor 230 may measure the distance between the electronic device 201 and the first external electronic device using various methods for measuring the distance between two electronic devices, according to an embodiment.

The processor 230 may obtain the distance and direction of the second external electronic device as it does on the first external electronic device, to determine information related to the position of the second external electronic device. According to an embodiment, a method for determining, by the processor 230, information associated with the positions of the first and second external electronic devices is described below in detail with reference to FIG. 8.

In operation 430, the processor 230 may detect communication, via the electronic device 201, between the first and second external electronic devices. For example, the first external electronic device may transmit data packets or instructions for communication with the second external electronic device to the electronic device 201, and the processor 230 may detect communication between the first and second external electronic devices based on the received data packets or instructions.

In operation 440, the processor 230 may control communication between the first and second external electronic devices. For example, the processor 230 may enable direct connection between the first and second external electronic devices as per a frequency band between 20 GHz and 100 GHz based on at least part of the information associated with the positions of the first and second external electronic devices. According to an embodiment, the processor 230 may calculate the distance and direction between the first and second external electronic devices based on the information associated with the positions of the first and second external electronic devices. The processor 230 may determine the distance between the first external electronic device 310 and the second external electronic device 320 and may control the first external electronic device 310 and the second external electronic device 320 to directly connect together based on at least part of the distance. According to an embodiment, the processor 230 may control the first and second external electronic devices to directly connect together as per a first frequency band between 20 GHz and 100 GHz and based on the distance and direction between the first and second external electronic devices. For example, the first frequency band may include 60 GHz. According to an embodiment, the processor 230 may control the first external electronic device to transmit data to the second external electronic device directly or via the electronic device 201 or another electronic device. For example, the processor 230 may estimate data transmission rates, i.e., data transmission speeds, as per data transmission paths for transmitting data directly, transmitting data via the electronic device 201, and transmitting data via the other electronic device, choose the data transmission path of the highest data transmission speed, and control data communication between the first and second external electronic devices. According to an embodiment, the processor 230 may estimate that the data transmission speed and data signal strength increase as the distance between the wirelessly communicating external electronic devices reduces, based on the distances between the first external electronic device, the second external electronic device, the electronic device, and the other electronic device. The processor 230 may more precisely estimate the data transmission rates considering, e.g., the channel utilization assigned to a given frequency band or the presence or absence of an obstacle between the two external electronic devices that may influence the data transmission rates.

Where the processor 230 controls data transmission between the first and second external electronic devices using the electronic device 201, the processor 230 may control data communication between the two electronic devices by receiving data from the first external electronic device and transmitting the received data to the second external electronic device via the first wireless communication channel and the second wireless communication channel. Where the processor 230 controls direct data communication between the first and second external electronic devices, the processor 230 may deliver a data packet containing distance and direction information about the second external electronic device to the first external electronic device. For example, the processor 230 may use an action frame or, a setup request frame through a tunneled direct link setup (TDLS), to deliver the distance and direction information about the second external electronic device to the first external electronic device. Where the processor 230 controls data communication between the first and second external electronic devices using the other electronic device (e.g., the second electronic device 302 of FIG. 3), the processor 230 may deliver the distance and direction information about the other electronic device 302 to the first external electronic device through BSS transition management (BSS).

FIGS. 5A to 5D are views illustrating circumstances in which an electronic device (e.g., the first AP 301, the second AP 302, or the third AP 303) controls data communication between external electronic devices (e.g., the first external electronic device 310 and the second external electronic device 320) according to an embodiment.

Figure 5A:
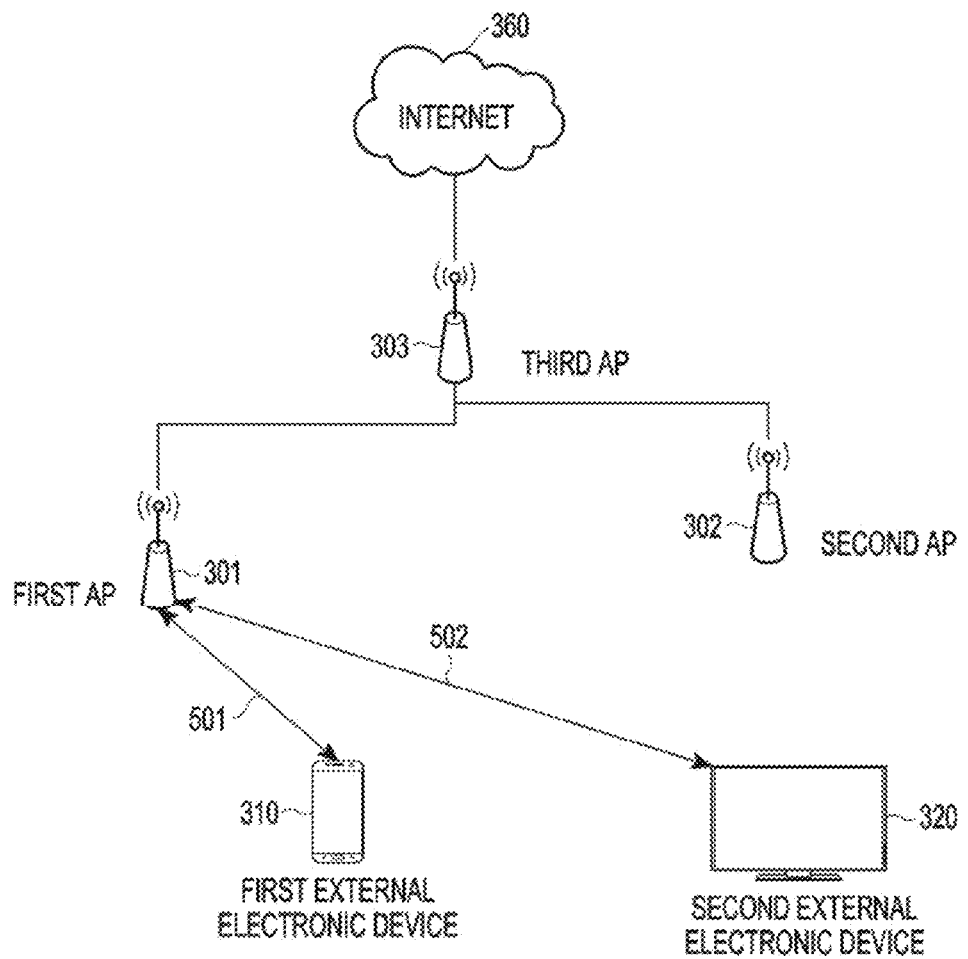
FIGS. 5A to 5D are views illustrating examples of controlling, by an electronic device, data communication between external electronic devices according to an embodiment.

FIG. 5A illustrates an example in which the electronic device (e.g., the first AP 301) receives data from the first external electronic device 310 and transmits data to the second external electronic device 320, controlling data communication between the first external electronic device 310 and the second external electronic device 320, according to an embodiment. The first AP 301 may be connected to the first external electronic device 310 via a wireless communication channel 501 and to the second external electronic device 320 via a wireless communication channel 502. Upon detecting a request for data communication between the first external electronic device 310 and the second external electronic device 320 from the first external electronic device 310, the first AP 301 may receive data from the first external electronic device 310 via the wireless communication channel 501 and transmit the received data to the second external electronic device 320 via the wireless communication channel 502.

Figure 5B:
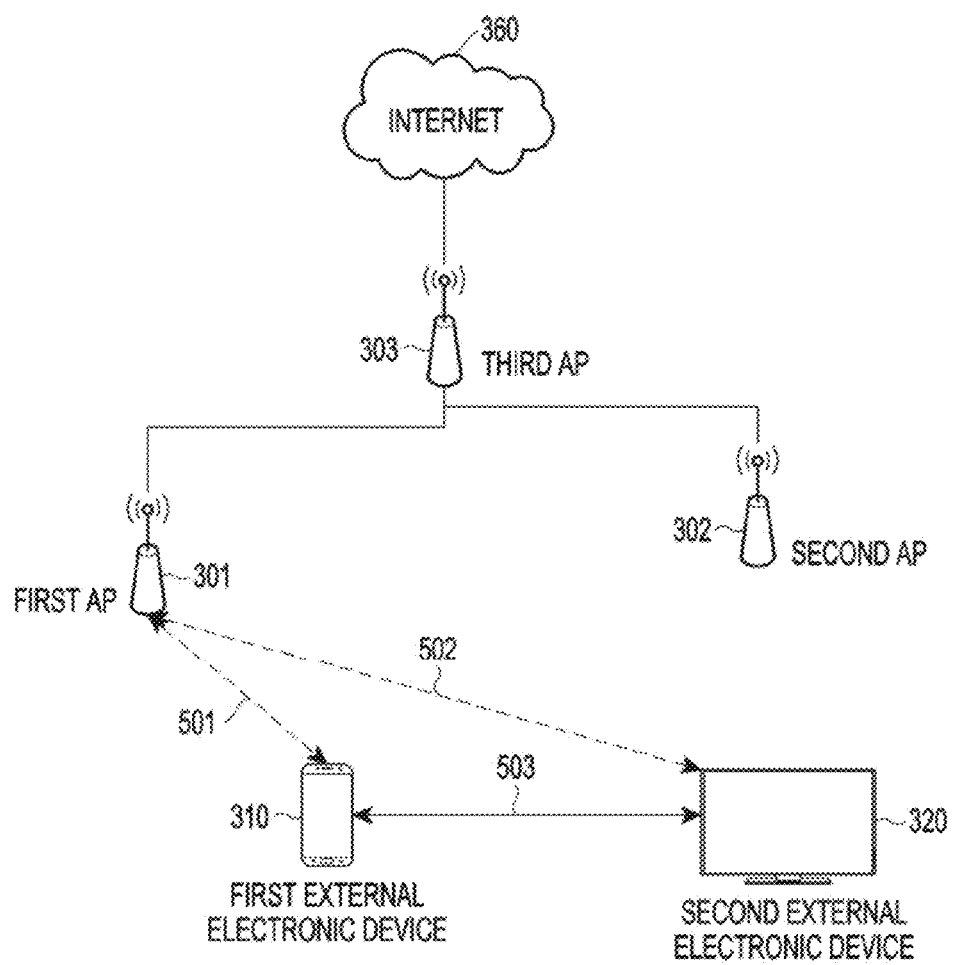

FIG. 5B illustrates an example in which the electronic device (e.g., the first AP 301) controls the first external electronic device 310 and the second external electronic device 320 to directly transmit data according to an embodiment. The first AP 301 may be connected to the first external electronic device 310 via a wireless communication channel 501 and to the second external electronic device 320 via a wireless communication channel 502. The first AP 301 may identify the distance and direction between the first external electronic device 310 and the second external electronic device 320 and determine whether direct wireless communication is possible between the first external electronic device 310 and the second external electronic device 320. Upon determining that direct wireless communication is possible between the first external electronic device 310 and the second external electronic device 320 and detecting a request for data communication between the first external electronic device 310 and the second external electronic device 320 from the first external electronic device 310, the first AP 301 may transmit the positions of the first and second external electronic devices to the first and second external electronic devices and control them to perform direct data communication. The first external electronic device 310 may form a direct wireless communication channel 503 with the second external electronic device 320 and may transmit and receive data via the wireless communication channel 503.

Figure 5C:
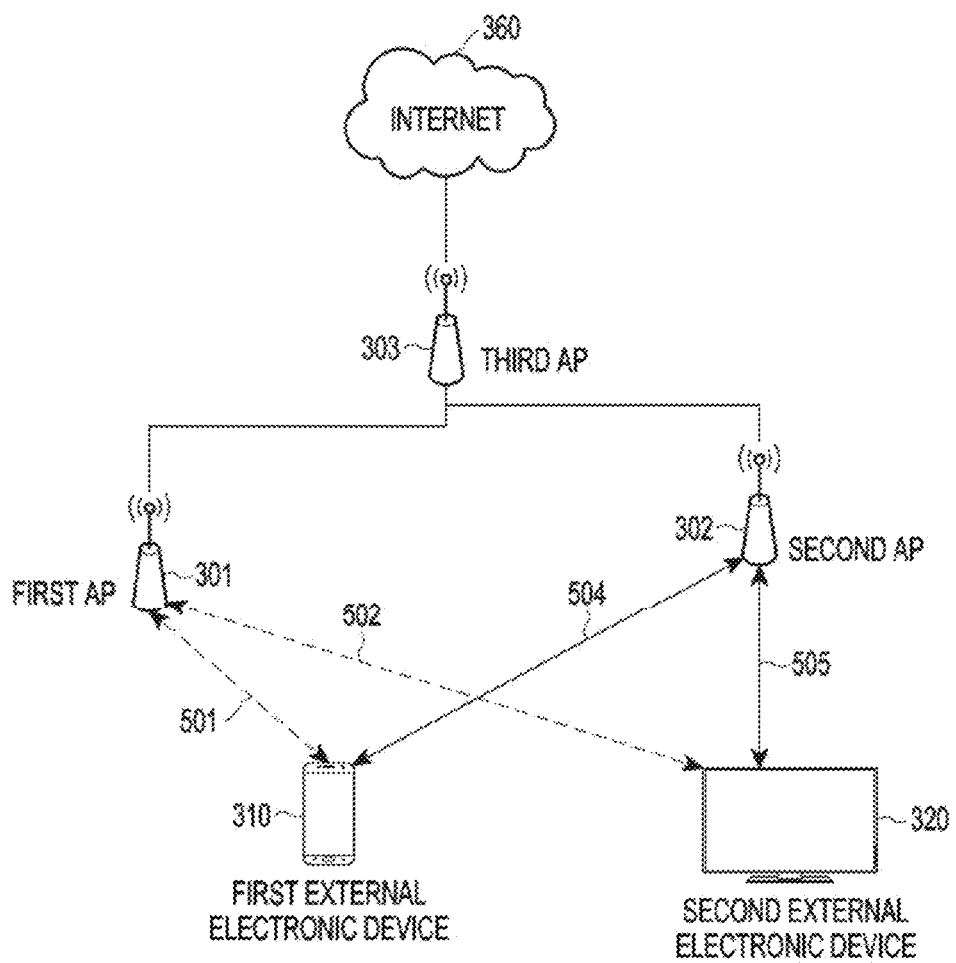

FIG. 5C is a view illustrating a circumstance in which an electronic device (e.g., the first AP 301) controls data communication between the first external electronic device 310 and the second external electronic device 320 via another AP (e.g., the second AP 302) according to an embodiment. The first AP 301 may be connected to the first external electronic device 310 via a wireless communication channel 501 and to the second external electronic device 320 via a wireless communication channel 502. The first AP 301 may identify the position of the second AP 302 and estimate the distance and direction between the first external electronic device 310 and the second AP 302 and the distance and direction between the second external electronic device 320 and the second AP 302. Upon determining that the data transmission speed is highest when the first external electronic device 310 transmits data to the second external electronic device 320 via the second AP 302 as compared with the case shown in FIG. 5A or FIG. 5B, the first AP 301 may control the first external electronic device 310 and the second external electronic device 320 to perform data communication via the second AP 302. For example, the first AP 301 may transmit information regarding the position of the second AP 302 to the first external electronic device 310 and the second external electronic device 320, and based on the information about the position of the second AP 302, the first external electronic device 310 may form a wireless communication channel 504 with the second AP 302 and the second external electronic device 320 may form a wireless communication channel 505 with the second AP 302. The first external electronic device 310 may transmit data to the second AP 302 via the wireless communication channel 504, and the second AP 302 may transmit the received data to the second external electronic device 320 via the wireless communication channel 505.

Figure 5D:
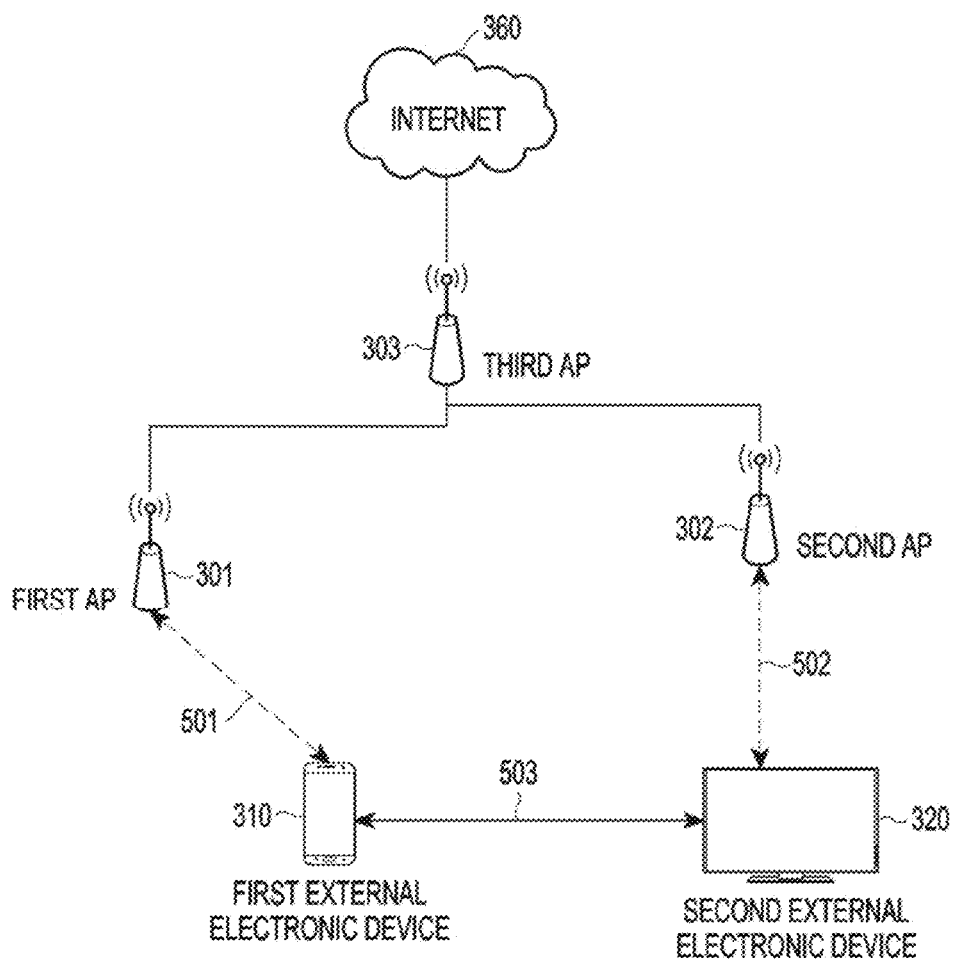

FIG. 5D illustrates an example in which the electronic device (e.g., the first AP 301, the second AP 302, or the electronic device 201 of FIG. 2) detects data communication between the first external electronic device 310 connected to the electronic device (e.g., the first AP 301) and the second external electronic device 320 connected to another electronic device (e.g., the second AP 302) and control the first external electronic device 310 and the second external electronic device 320 to directly connect to each other, according to an embodiment. For example, the first external electronic device 310 may be connected to the first AP 301 via a wireless communication channel 501 to perform data communication with the second external electronic device 320. The second external electronic device 310 may be connected to the second AP 302 via a wireless communication channel 502 to perform data communication with the first external electronic device 310. According to an embodiment, the electronic device (e.g., the electronic device 201 of FIG. 2) may detect data communication between the first external electronic device 310 and the second external electronic device 320. For example, the first external electronic device 310 is connected to the first AP 301, and the second external electronic device 320 is connected to the second AP 302, and the electronic device may detect data communication between the first external electronic device 310 and the second external electronic device 320 via the first AP 301 and the second AP 302. The electronic device 201 may determine information about the positions of the first external electronic device 310 and the second external electronic device 320 and control the first external electronic device 310 and the second external electronic device 320 to directly connect to each other via a wireless communication channel 503 based on at least part of, e.g., the distance and supportable frequency band between the first external electronic device 310 and the second external electronic device 320. For example, upon determining that the distance between the first external electronic device 310 and the second external electronic device 320 is a distance within which communication is possible in a 60 GHz frequency band and that the first external electronic device 310 and the second external electronic device 320 may perform 60 GHz frequency band wireless communication, the electronic device 201 may transmit data packets containing location information about the first external electronic device 310 and the second external electronic device 320 to the first external electronic device 310 and the second external electronic device 320, allowing the first external electronic device 310 to directly connect to the second external electronic device 320.

Figure 6A:
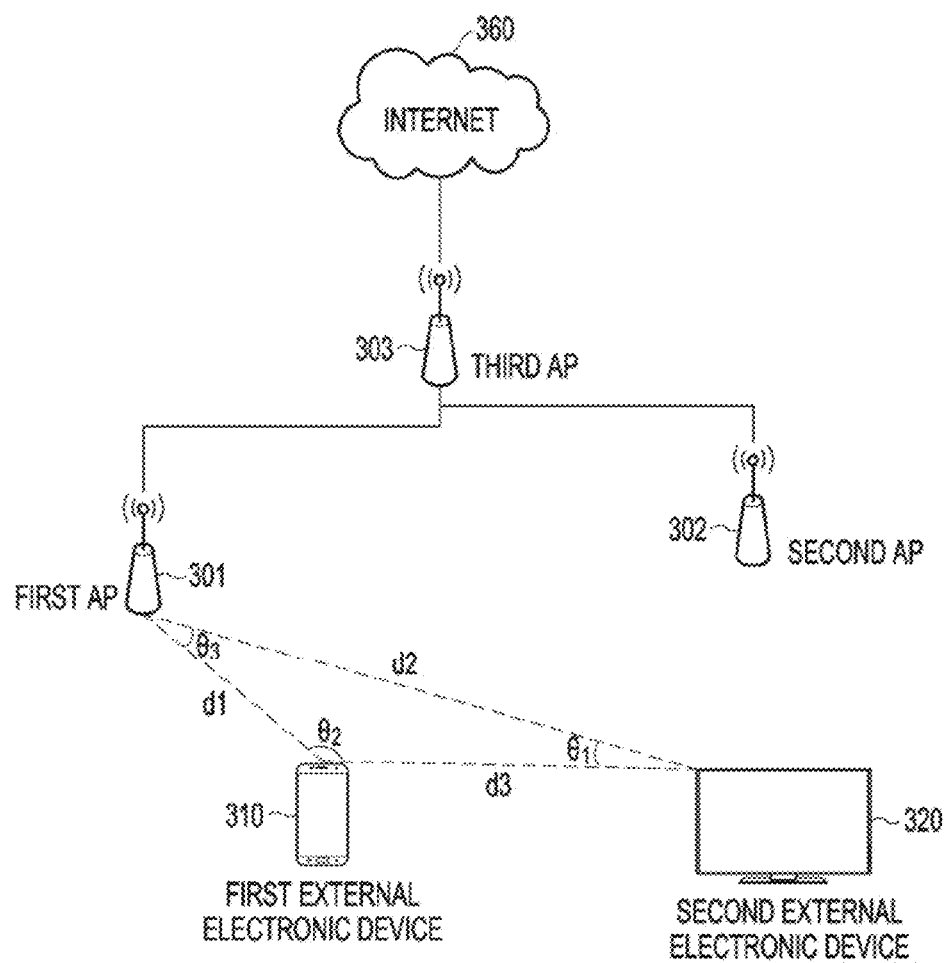
FIGS. 6A and 6B are views illustrating an example of a method for determining, by an electronic device, a relationship in location with an external electronic device according to an embodiment.
Figure 6B:
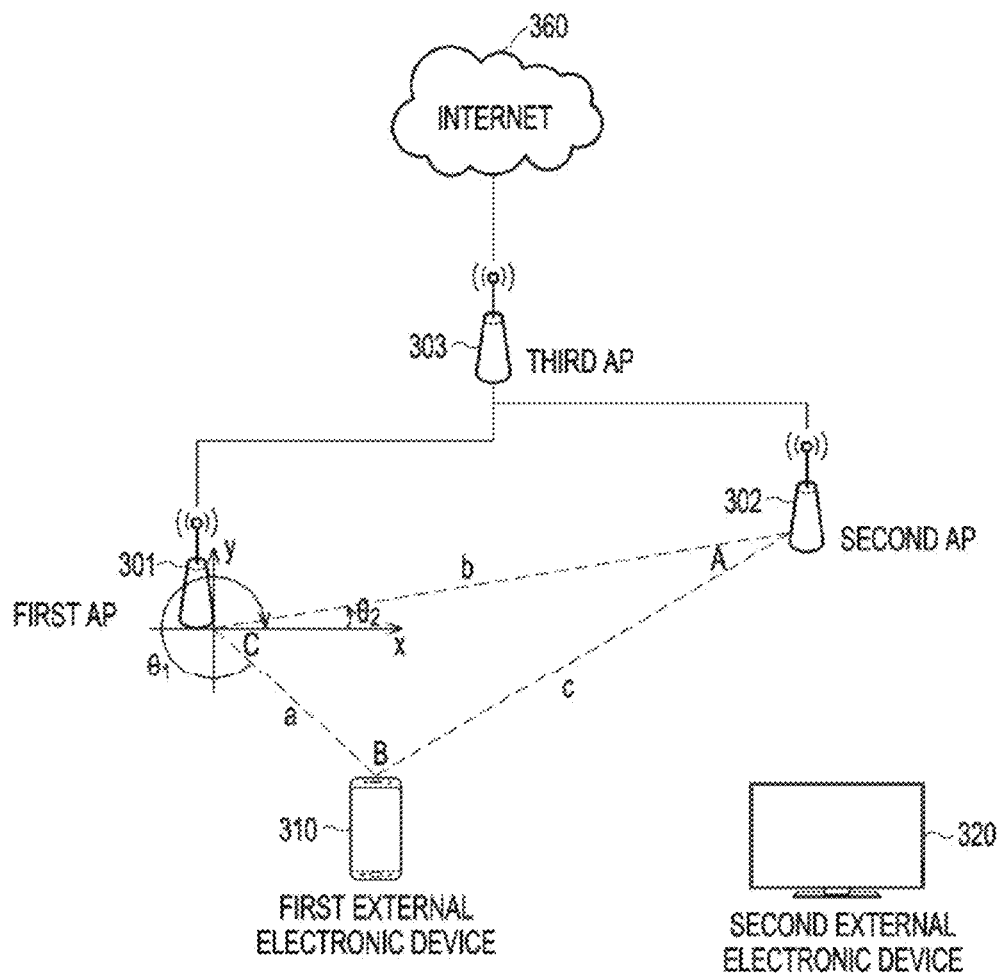

FIGS. 6A and 6B are views illustrating an example of a method for determining, by an electronic device (e.g., a first AP), a relationship in location with an external electronic device according to an embodiment. Referring to FIG. 6A, one SS may include a plurality of APs (e.g., the first AP 301, the second AP 302, and the third AP 303) and a plurality of external electronic devices (e.g., the first external electronic device 310 and the second electronic device). Referring to FIG. 6A, the first AP 301 may calculate the distance d3 between the first external electronic device 310 and the second external electronic device 320 based on the distance d1 between the first AP 301 and the first external electronic device 310, the distance d2 between the first AP 301 and the second external electronic device 320 320, and the angle θ3 between the first external electronic device 310 and the second external electronic device 320. First, the first AP 301 may obtain the distance and angle of the first external electronic device 310 using another AP 302 whose position is known to the first AP 301.

Referring to FIG. 6B, the first AP 301 may perform fine timing measurement (FTM) and angle-of-arrival (AOA) on the first external electronic device 310 to obtain the distance and direction of the first external electronic device 310. The first AP 301 is assumed to previously know the distance and direction of the second AP 302. For example, the first AP 301, the second AP 302, and the third AP 303 have less mobility and may be aware of their mutual positions based on indoor location information or indoor positioning information. The distance between the first AP 301 and the first external electronic device 310, the distance between the first AP 301 and the second AP 302, and the distance between the second AP 302 and the first external electronic device 310 are denoted a, b, and c, respectively. Where the vertex angles of the triangle are denoted A, B, and C, corresponding to when the bases are a, b, and c, respectively, the first AP 301 may obtain the distance a and angle θ3 with respect to the first external electronic device 310 and the distance b and angle θ3 with respect to the second AP 302 by the FTM and AOA on the first external electronic device 310. For example, the first AP 301 may obtain the angle θ2 from the x axis to the second AP 302 with respect to the first AP 301 in the coordinate systems with the x axis and the y axis. The first AP 301 may obtain the angle θ1 from the first external electronic device 310 to the x axis. The first AP 301 may obtain the vertex angles C and the base c using the values and may then obtain the vertex angles B and A.

First, the vertex angle C may be obtained using the difference between θ1 and θ2 as set forth in Equation 1.

$$C=|\theta_1-\theta_2|$$ [Equation 1]

Next, the base c may be obtained using the cosine rule as set forth in Equation 2.

$$c^2=a^2+b^2-2ab\cos C$$ [Equation 2]

The angles A and B may be calculated using the sine rule as set forth in Equation 3.

$$A = \sin^{-1}\left(\frac{a\sin C}{c}\right), B = \sin^{-1}\left(\frac{b\sin C}{c}\right)$$ [Equation 3]

By the above method, the first AP 301 may obtain the distance and direction of the first external electronic device 310. In the same manner, the first AP 301 may obtain the distance and direction of the second external electronic device 320.

Referring back to FIG. 6A, the first AP 301 may calculate the distance d3 and direction between the first external electronic device 310 and the second external electronic device 320 based on the distance d1 and direction to the first external electronic device 310 and the distance d2 and direction to the second external electronic device 320.

The first AP 301 may determine whether to perform direct data communication (e.g., Wi-Fi direct) between the first external electronic device 310 and the second external electronic device 320 based on the distances and directions. According to an embodiment, the first AP 301 may enable the first external electronic device 310 to transmit data to the second external electronic device 320 via the first AP 301 (the scenario shown in FIG. 5A). Alternatively, the first AP 301 may enable the first external electronic device 310 to directly transmit data to the second external electronic device 320 (the scenario shown in FIG. 5B). According to an embodiment, the first AP 301 may control data communication between the first external electronic device 310 and the second external electronic device 320 using the second AP 302. Now described is an embodiment in which the first AP 301 determines a data transmission path between the first external electronic device 310 and the second external electronic device 320 using the distance information d1, d2, and d3 calculated as shown in FIG. 6A.

Where the distance d3 between the first external electronic device 310 and the second external electronic device 320 is larger than a predetermined threshold, the first AP 301 may determine that direct data communication between the first external electronic device 310 and the second external electronic device 320 is inappropriate. For example, the threshold may experimentally be determined as a distance limit within which 60 GHz wireless communication is improper.

Where the distance d3 between the first external electronic device 310 and the second external electronic device 320 is not larger than the predetermined threshold, the first AP 301 may estimate the link speed or data transmission rate between the first external electronic device 310 and the second external electronic device 320 based on the distance d3 between the first external electronic device 310 and the second external electronic device 320. Available according to an embodiment is a data table containing experimental data about data transmission rates as per distances and frequency bands, which is described below in connection with FIG. 10. Alternatively, the first AP 301 may estimate the link speed for direct connection under the assumption that the link speed is proportional to the distance.

Assuming that the link speed between the first AP 301 and the second external electronic device 320 is r1, and the link speed between the first AP 301 and the second external electronic device 320 is r2, the first AP 301 may estimate the link speed, rdirect, between the first external electronic device 310 and the second external electronic device 320 as set forth in, e.g., Equation 4.

i) if $d_1-d_2>0$ and $r_1-r_2>0$, then $r_{direct}=(r_1-r_2)/(d_1-d_2)*(d_2-d_1)*r_2$ ii) else if $d_2-d_1>0$ and $r_2-r_1>0$, then $r_{direct}=(r_2-r_1)/(d_2-d_1)*(d_3-d_1)+r_1$ iii) else if $|d_3-d_2|<|d_{3-d}-d_1|$, then $r_{direct}=r_2/d_2*d_3$ iv) else $r_{direct}=r_1/d_1*d_3$ [Equation 4]

In Equation 4 above, i) and ii) are the results of estimating rdirect under the assumption that the distance is linearly proportional to the link speed, and iii) and iv) are the results obtained from a comparative equation between distance and link speed with only the closer to d3 of d1 and d2 chosen when they are not expressed in a first-order linear function.

Where the link speed for the scenario in which the first external electronic device 310 transmits data t the second external electronic device 320 via the first AP 301 is rAP, it may be calculated as set forth in Equation 5 below.

$$r_{AP} = \frac{1}{(hopcount)} \min(r_1, r_2) \quad \text{[Equation 5]}$$

In Equation 5 above, the hop count may denote the number of APs that it is supposed to go through to connect to the internet. For example, where AP A and AP B are wirelessly in connection, AP A can immediately be connected to the internet, and the other AP, AP B, may go through AP A to connect to the internet, the hop count of AP A may be 1, and the hop count of APB may be 2.

The first AP 301 may calculate rdirect using Equation 4 and rAP using Equation 5 and select the path of the larger of rdirect and rAP, determining the data transmission path for the first external electronic device 310 and the second external electronic device 320. Where rdirect is larger than rAP, the first AP 301 may relay on setting up direct data communication between the first external electronic device 310 and the second external electronic device 320, e.g., as shown in FIG. 5B. For example, the first AP 301 may transmit a tunneled direct link setup (TDLS) setup request frame to the first external electronic device 310 (or the second external electronic device 320). Where rdirect is equal or smaller than rAP, the first AP 301 may control data communication to allow the first external electronic device 310 and the second external electronic device 320 to transmit data via the first AP 301, e.g., as shown in FIG. 5A.

According to an embodiment, where the link speed for the scenario in which the first external electronic device 310 transmits data to the second external electronic device 320 via the second AP 302 is rAP2, the first AP 301 may calculate rAP2, instead of rAP, by substituting r3 with r1 and r4 with r2 in Equation 5, wherein r3 is the link speed between the second AP 302 and the first external electronic device 310, and r4 is the link speed between the second AP 302 and the second external electronic device 320. Where rAP2 is compared with rdirect and rAP, and rAP2 is the largest value, the first AP 301 may control the first external electronic device 310 and the second external electronic device 320 to perform data communication via the second AP 302, e.g., as shown in FIG. 5C.

FIG. 7 is a sequence diagram illustrating an example of controlling, by an electronic device (e.g., the first AP 301), direct data communication between the electronic device and an external electronic device 310 or 320 according to an embodiment. According to an embodiment, the first AP 301 may control the first external electronic device 310 to directly perform data communication with the second external electronic device 320 and may transmit, to the first external electronic device 310 via a TDLS setup request frame, a relative angle A that is available when the first external electronic device 310 transmits data to the second external electronic device 320 and a relative angle B that is available when the second external electronic device 320 transmits data to the first external electronic device 310.

In operation 701, the first AP 301 may transmit, to the first external electronic device 310, the TDLS setup request containing information about the relative angles B and A between the first external electronic device 310 and the second external electronic device 320. For example, the TDLS setup request transmitted from the first AP 301 to the first external electronic device 310 may be sent out by the first AP 301, with the relative angle B, which is available when the first external electronic device 310 transmits data to the second external electronic device 320, and relative angle A, which is available when the second external electronic device 320 transmits data to the first external electronic device 310, carried in an information field in the order of B and A.

In operation 702, in response to the TDLS setup request, the first external electronic device 310 may transmit a TDLS setup response to the first AP 301. The TDLS setup response frame may include an information field containing the relative angles B and A between the first external electronic device 310 and the second external electronic device 320.

In operation 703, the first AP 301 may transmit a TDLS response signal to the second external electronic device 320, corresponding to the TDLS setup response signal received from the first external electronic device 310. For example, the first AP 301 may send out the TDLS setup request to the second external electronic device 320, with the relative angle A, which is available when the second external electronic device 320 transmits data to the first external electronic device 310, and relative angle B, which is available when the first external electronic device 310 transmits data to the second external electronic device 320, carried in the information field in the order of A and B.

In operation 704, the second external electronic device 320 may transmit a TDLS setup acknowledge (ack) signal to the first AP 301 in response to the TDLS setup response signal.

In operation 705, the first AP 301 may deliver the TDLS setup ack signal of the second external electronic device 320 to the first external electronic device 310, completing the setup for direct connection of the first external electronic device 310 to the second external electronic device 320.

In operation 706, the first external electronic device 310 may establish direct data communication to the second external electronic device 320. For example, when the first external electronic device 310 performs beam training using a sector level sweep (SLS) protocol as defined in 802.11ad, the first external electronic device 310 may perform efficient SLS beam training by transmitting a sector sweep (SSW) packet in a limited area based on a sector ID resulting from changing the angle by B from the direction of the beam used upon transmission and reception with the first AP 301. Likewise, in operation 707, the second external electronic device 320 may perform SSW in the limited area using angle A.

When the data communication is complete between the first external electronic device 310 and the second external electronic device 320, the first external electronic device 310, in operation 708, may transmit a TDLS teardown request to the first AP 301, performing a series of operations (709 to 711) and releasing the direct connection with the first external electronic device 310. When the first external electronic device 310 transmits a TDLS teardown request to the first AP 301 in operation 708, the first AP 301 may deliver the TDLS teardown request to the second external electronic device 320 in operation 709. In operation 710, the second external electronic device 320 may transmit a TDLS teardown ack signal to the first AP 301. In operation 711, the first AP 301 may deliver the TDLS teardown ack signal to the first external electronic device 310. The first AP 301 may relay on the data communication (operations 707 and 708) between the first external electronic device 310 and the second external electronic device 320, as well as the release of the wireless communication between the first external electronic device 310 and the second external electronic device 320.

Figure 8:
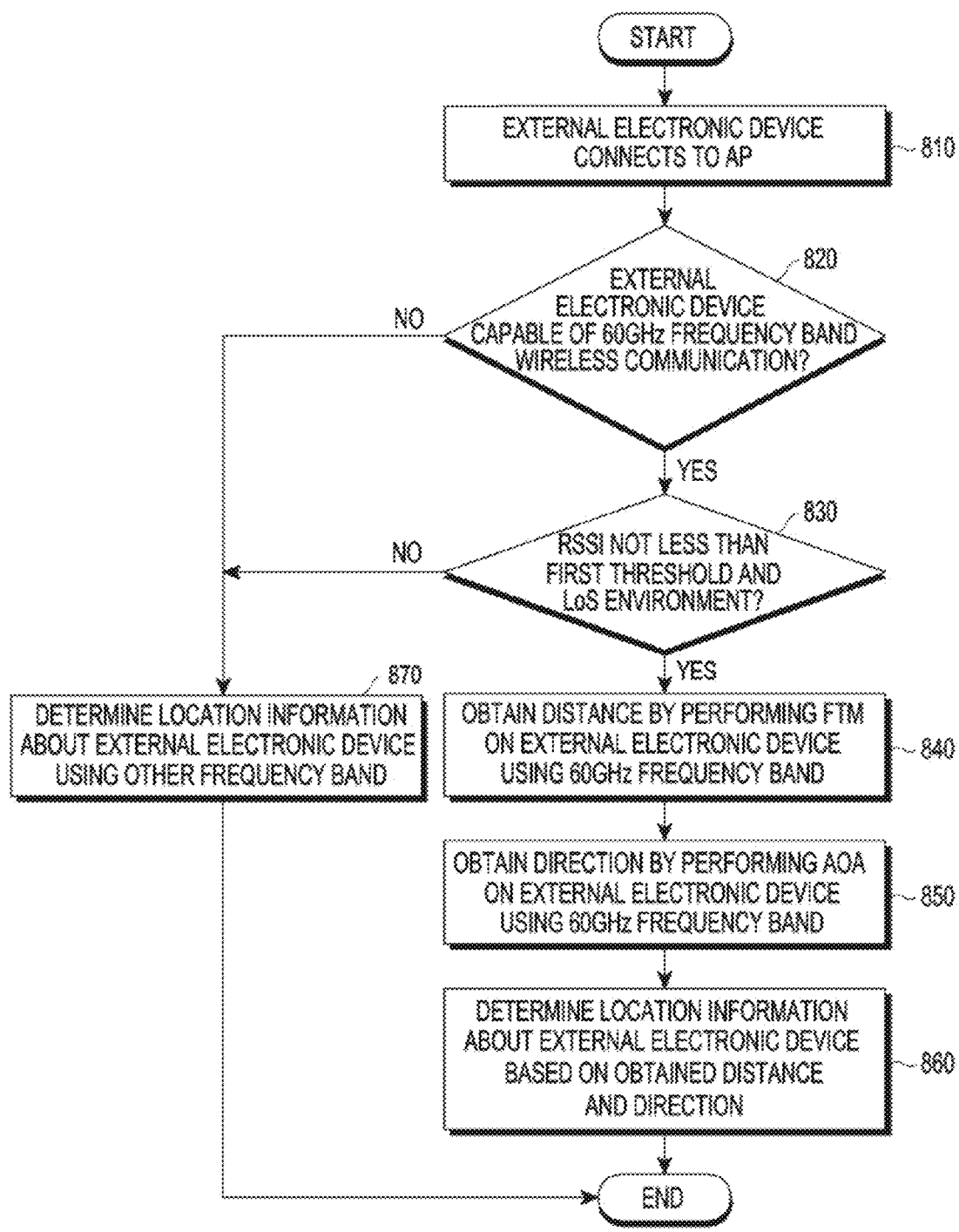
FIG. 8 is a flowchart illustrating a method for determining, by an electronic device, location information about an external electronic device using a frequency band of 60 GHz according to an embodiment.

FIG. 8 is a flowchart illustrating a method for determining, by an electronic device, location information about an external electronic device using a frequency band of 60 GHz according to an embodiment. For example, 802.11ad 60 GHz wireless communication, as compared with 2.4 GHz/5 GHz WLAN systems, enables very accurate distance and angle estimation. According to an embodiment, the electronic device 201 (e.g., the AP 301) may precisely estimate the distances d1 and d2 and angle θ3 to the first external electronic device and the second external electronic device using 802.11ad 60 GHz wireless communication.

In operation 810, an external electronic device (e.g., the first external electronic device 310 or the second external electronic device 320) may be connected to the AP 301 according to an embodiment.

In operation 820, the AP 301 may identify whether the external electronic device may perform 60 GHz frequency band wireless communication. According to an embodiment, the AP 301 may identify the frequency band in which the external electronic device is connected, and where the identified frequency band is a frequency band of 60 GHz, the AP 301 may obtain the distance and angle to the external electronic device by performing FTM and AOA.

The AP 301 may identify the frequency band in which the external electronic device is connected, and unless the identified frequency band is a frequency band of 60 GHz, the AP 301 may separately identify whether the external electronic device supports 60 GHz wireless communication. For example, the AP may make use of the multi-band element field in the information field contained in the IEEE 802.11 management frame (e.g., the medium access control (MAC) frame, such as beacon, probe request, probe response, association request, or association response). The AP may identify whether the connected external electronic device supports 60 GHz wireless communication by identifying the multi-band element field of the external electronic device.

Upon determining that the external electronic device enables 60 GHz wireless communication, the AP 301, in operation 830, may determine whether the received signal strength indication (RSSI) is not less than a first threshold and corresponds to a light-of-sight (LoS) environment. For example, where the external electronic device connected with the AP 301 supports 60 GHz wireless communication, the AP 301 may identify whether it is under the LoS environment by way of channel state information or RSSI information via 2.4 GHz or 5 GHz communication. In other words, the AP 301 may identify whether the external electronic device may perform 60 GHz frequency band wireless communication. For example, upon determining that the RSSI is not less than the first threshold or it is under the LoS environment, the external electronic device may be determined to be in the environment where the external electronic device may perform 60 GHz frequency band wireless communication. According to an embodiment, the first threshold may experimentally be determined as an RSSI at which 60 GHz communication is possible among 2.4 GHz/5 GHz RSSIs. Whether it is under the LoS environment may be determined by the statistical properties of the channel, and the kurtosis and skewness of the statistical properties may experimentally be determined.

Where the RSSI is not less than the first threshold, and the LoS environment is available, upon determining that the external electronic device may perform 60 GHz wireless communication, the AP 301 may activate (or enable) 60 GHz wireless communication for the external electronic device and perform FTM and AOA based on the 60 GHz wireless communication, obtaining the distance and angle between the AP and the external electronic device. In operation 840, the AP 301 may obtain the distance between the AP 301 and the external electronic device by performing FTM on the external electronic device using the 60 GHz frequency band. According to an embodiment, the AP 301 may estimate the distance by measuring the round trip time (RTT) between the AP and the external electronic device by performing FTM as defined in the IEEE 802.11 standards.

In operation 850, the AP 301 may obtain the direction (angle) between the AP 301 and the external electronic device by performing AOA on the external electronic device using the 60 GHz frequency band. For example, the AP 301 may estimate the direction (angle) to the external electronic device using 60 GHz frequency band phased array antennas.

In operation 860, the AP 301 may determine location information about the external electronic device based on the obtained distance and direction to the external electronic device. The location information about the external electronic device may include a relative distance and direction between the AP 301 and the external electronic device.

Where the connected external electronic device may not support 60 GHz frequency band wireless communication or the RSSI is less than the first threshold or the LoS environment is unavailable, the AP 301 may determine the location information about the external electronic device using a frequency band other than the 60 GHz frequency band in operation 870. For example, the AP 301 may transmit or receive data packets via another AP whose position is known thereto, using the 5 GHz frequency band and apply a proportional relationship between the distance and the time statistically calculated or triangulation to the time taken for data packet transmission/reception, estimating the relative distance and direction between the AP 301 and the external electronic device.

According to an embodiment, the AP 301 may obtain the distance and angle to the other external electronic device in the same manner. The AP 301 may precisely obtain the distance and angle by performing FTM and AOA on the other AP than the external electronic device serving as a client, using 60 GHz wireless communication. According to an embodiment, the distance and angle to the other AP may be obtained by performing FTM and AOA thereon even when the other AP is not connected to the first AP and no wireless connection is established therebetween.

Figure 9:
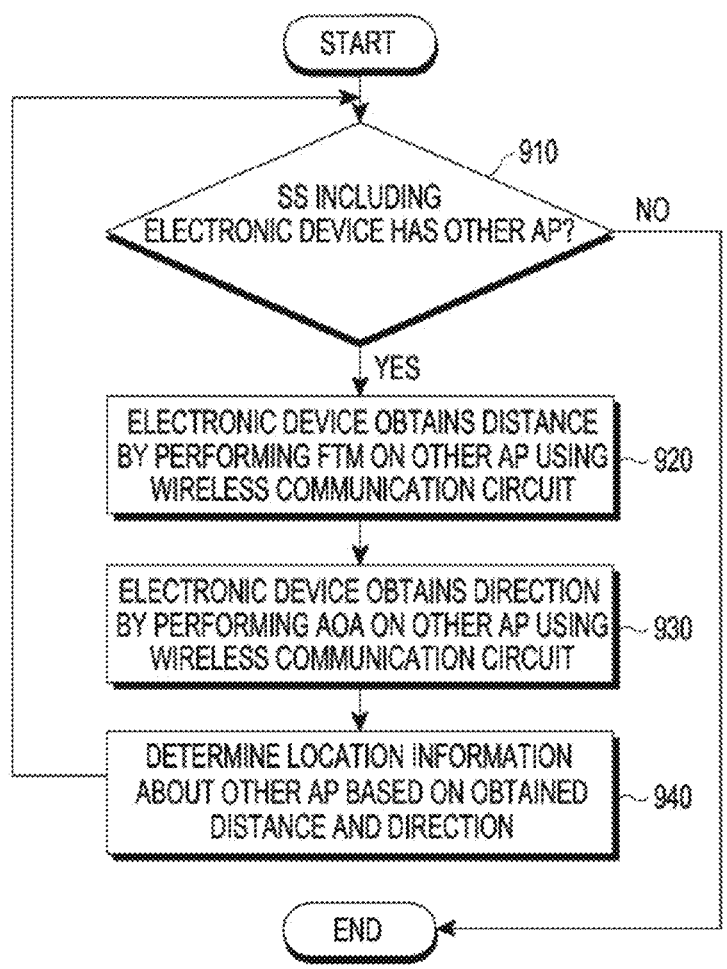
FIG. 9 is a flowchart illustrating a method for determining, by an AP, location information about another AP according to an embodiment.

FIG. 9 is a flowchart illustrating a method for determining, by an AP, location information about another AP according to an embodiment. According to an embodiment, the electronic device 201 (or the AP 301) may control the external electronic devices (e.g., the first external electronic device 310 and the second external electronic device 3200 to use another AP (e.g., the second AP 302) to control data communication between the external electronic devices. Based on, e.g., location information about another AP (e.g., the second AP 302) sharing the same SS with the first AP 301, supported frequency band information, or frequency channel utilization information, the first AP 301 may perform control to select any one among other APs in the same SS and perform data communication between the external electronic devices.

In operation 910, according to an embodiment, the electronic device 201 (or the first AP 301) may identify whether there is another AP (e.g., the second AP) connected to the SS including the first AP 301. For example, referring to FIG. 3, the second AP 302 and a third AP 303 may be connected to the same SS as the first AP 301. In operation 910, the second AP may be the second AP 302 or the third AP 303 of FIG. 3.

In operation 920, the first AP 301 may perform FTM on another AP (e.g., the second AP) via the wireless communication circuit, obtaining the distance between the first AP 301 and the other AP (e.g., the second AP).

In operation 930, the first AP 301 may perform AOA on another AP (e.g., the second AP) via the wireless communication circuit, obtaining the direction (angle) between the first AP 301 and the other AP (e.g., the second AP).

In operation 940, the first AP 301 may determine location information about the other AP (e.g., the second AP) based on the distance and direction obtained in operations 920 and 930.

Operations 910 to 940 may be repeated to determine location information about all the other APs in the SS including the first AP. For example, the first AP 301 may perform FTM and AOA on the third AP 303 using the wireless communication circuit, obtaining the distance and direction between the first AP 301 and the third AP 303.

FIG. 10 is a view illustrating an example of a data transmission rate table as per distances and frequency bands according to an embodiment. According to an embodiment, the electronic device 201 (e.g., the AP 301) may consider the distance and data transmission rate between the first external electronic device 310 and the second external electronic device 320 to control data communication between the first external electronic device 310 and the second external electronic device 320. In other words, the AP 301 may control data communication between the first external electronic device 310 and the second external electronic device 320 based on the data transmission rate as per distance and bandwidth. For example, the AP 301 may previously store statistical values for the data transmission rate table as per distances and frequency bands with respect to the AP 301. For example, as shown in FIG. 10, in a short distance, the rate for when the 60 GHz band is used is highest; as the distance increases, the rate for when the 5 GHz band is used may become higher than the rate for when the 60 GHz band is used; and as the distance is mush farther away, the rate may be highest when the 2.4 GHz band is used. The AP 301 may select the frequency which is highest among the data transmission rates of FIG. 10 corresponding to the distance to the external electronic device and may control data communication with the external electronic device.

As another example, the 1-channel utilization (CU) may increase as the bandwidth increases, as shown in FIG. 10. Thus, the rate considering the channel utilization, i.e., the rate obtained by multiplying the original rate with (1-CU), may increase as the bandwidth decreases. Accordingly, where the AP 301 considers the channel utilization, the AP 301 may select a smaller bandwidth.

The AP 301 may determine the distance between the first external electronic device and the second external electronic device and may control data communication between the first external electronic device and the second external electronic device based on the distance. The distance between two devices performing data communication may influence the data transmission rate. That is, as the distance between the two external electronic devices performing data communication increases, the data transmission rate may decrease. According to an embodiment, the electronic device 201 (e.g., the AP 301) may control the external electronic devices to perform data communication therebetween using an AP located closer to the external electronic devices. The data transmission speed may increase as the distance reduces, and even when the amount of data transmitted is large, data transmission may be done within a relatively short time. According to an embodiment, the AP 301 may determine another AP that has a distance sum smaller than the sum of the distances to the first external electronic device and the second external electronic device, i.e., the sum of a first distance between the first AP 301 and the first external electronic device and a second distance between the first AP 301 and the second external electronic device and control the first external electronic device and the second external electronic device to perform data communication using the other AP.

The AP 301 may experimentally create a table with 2.4 GHz, 5 GHz, and 60 GHz bands as per distances and per-bandwidth data transmission rates estimated and may determine the optimal AP and the optimal frequency band based on the data transmission rate that matches the estimated distance. According to an embodiment, the AP 301 may determine the optimal data transmission path by referencing the data transmission rate table of FIG. 10 for the data transmission rate predicted per frequency band applicable to each of the distance between the external electronic devices, the distance to the other AP, and the distance to the first AP.

According to an embodiment, the AP 301 may reflect real-time data transmission rates considering the channel utilization (CU). In other words, the AP 301 may control data communication between the first external electronic device 310 and the second external electronic device 320 based on the channel utilization for the bandwidth. For example, where the highest data transmission rate is predicted to happen when data communication between the external electronic devices is performed using the first AP and based on the distance, the real-time channel utilization of the first AP may be high, and thus, it might be more efficient to perform data communication between the external electronic devices using another AP that has lower channel utilization but is substantially farther away from the first AP. To take this into consideration, the AP 301 may simply multiply each data transmission rate, as per the distance, in the data transmission rate table of FIG. 10 with the 1-channel utilization (CU).

Figure 11:
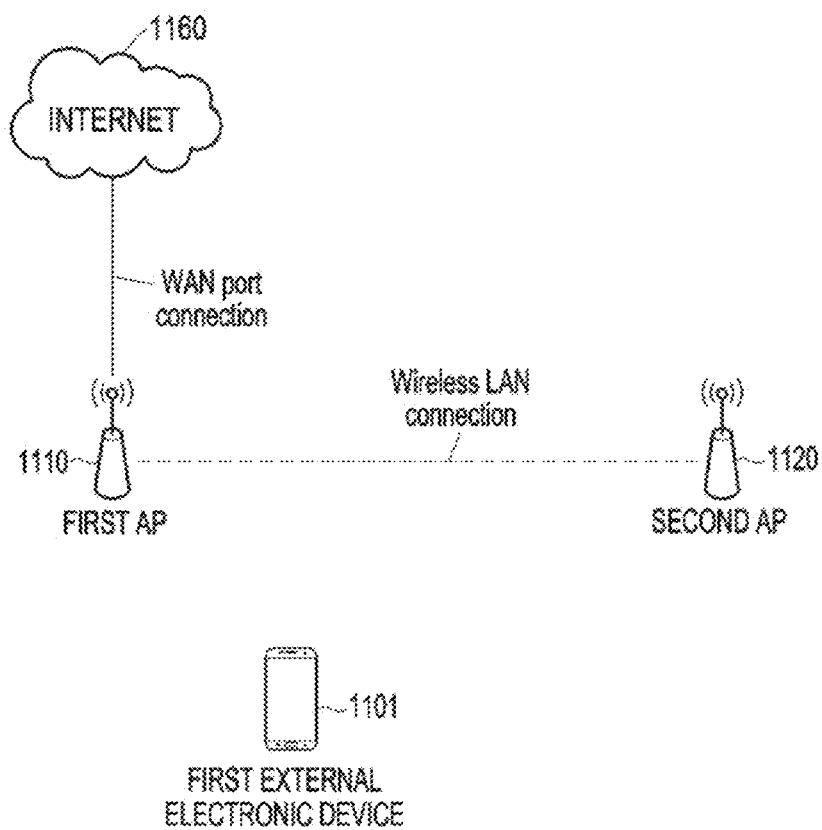
FIG. 11 is a concept view illustrating a system including an AP and a sub AP according to an embodiment.

FIG. 11 is a concept view illustrating a system including an AP (e.g., a first AP 1110) and a sub AP (e.g., a second AP 1120) according to an embodiment. Although the AP 1110 may directly connect to the internet 1160, the sub AP 1120 may only connect to the internet via another AP (e.g., the AP 1110). For example, where the first external electronic device 1101 connects to the internet 1160 via the first AP 1110, the data transmission rate may be higher than where it connects to the internet 1160 via the second AP 1120. This may be why upon using the second AP 1120, the first external electronic device 1101 goes through the first AP 1110 to connect to the internet 1160. Hop count may mean the number of steps that an AP (e.g., the first AP 1110 or the second AP 1120) goes through to connect to the internet. According to an embodiment, to select the optimal data transmission path between the external electronic devices in the network environment including the sub AP (e.g., the second AP 1120), the electronic device 201 (e.g., the AP 1110) may multiply each data transmission rate in the data transmission rate table of FIG. 10 with the reciprocal of the hop count, with the hop count being 1 for the AP 1110 and 2 for the sub AP 1120. According to an embodiment, the electronic device 201 (e.g., the AP 1110) may control data communication of the first external electronic device 1101 considering the data transmission rates as per the distances and frequency bands between the first external electronic device 1101 and the first AP 1110 and the second AP 1120. For example, even when the distance between the first external electronic device 1101 and the second AP 1120 is shorter than the distance between the first external electronic device 1101 and the first AP 1110, given the hop counts for the first AP 1110 and the second AP 1120, the data transmission rates may be higher when the first external electronic device 1101 performs data communication with the first AP 1110. In the scenario shown in FIG. 11, the electronic device 201 may control the first external electronic device to connect to the internet 1160 and perform data communication using the first AP 1110 which is farther away from the first external electronic device 1101 than the second AP 1120 is.

Figure 12:
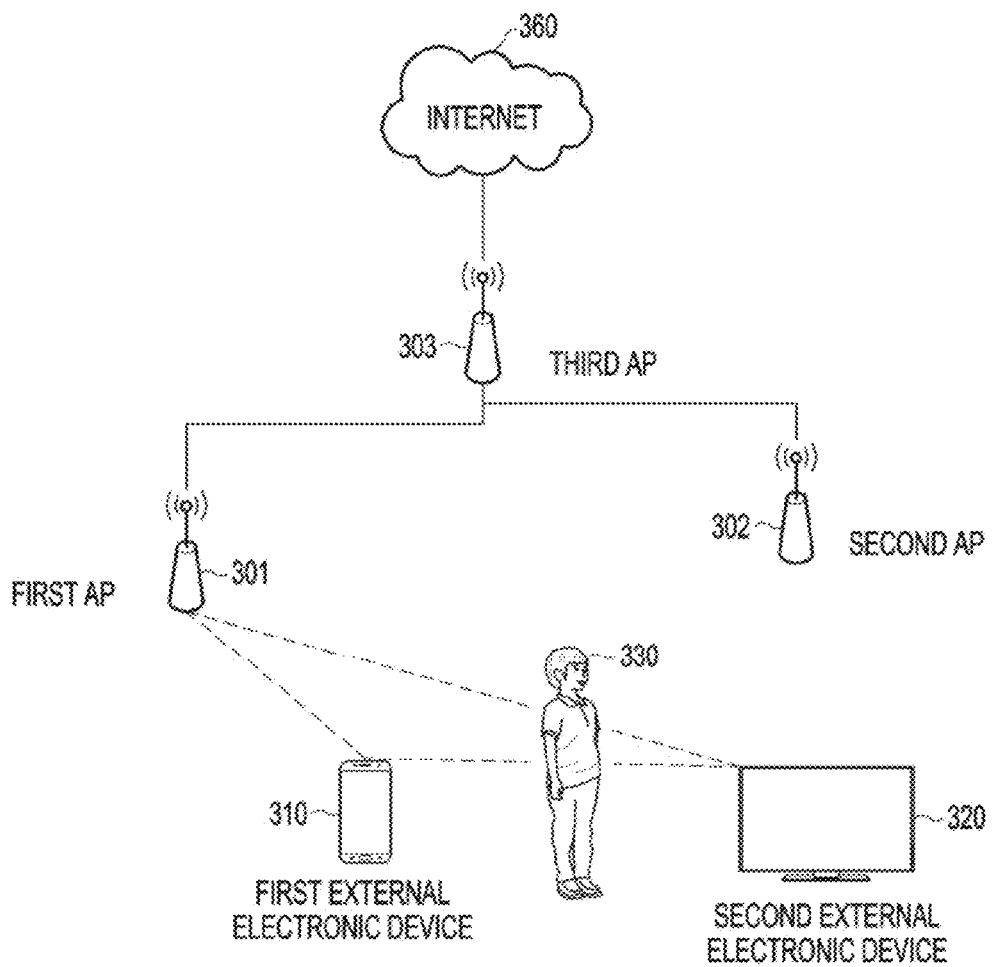
FIG. 12 is a view illustrating an example of a method for controlling, by an electronic device, data communication of an external electronic device in a network environment including an obstacle according to an embodiment.

FIG. 12 is a view illustrating an example of a method for controlling, by an electronic device, data communication of an external electronic device in a network environment including an obstacle according to an embodiment. According to an embodiment, an electronic device (e.g., the first AP 301) may identify at least one obstacle 330, which disturbs direct connection between the first external electronic device 310 and the second external electronic device 320, on a straight line path between the first external electronic device 310 and the second external electronic device 320 and may control data communication between the first external electronic device 310 and the second external electronic device 320 considering the at least one obstacle.

The first AP 301 may determine information related to the positions of the first external electronic device 310 and the second external electronic device 320 and identify the straight line path between the first external electronic device 310 and the second external electronic device 320 from the determined location information. For example, 60 GHz frequency band wireless communication, by its rectilinear propagation, may not be seamlessly carried out where an obstacle is present on the straight line path between the two devices. In this case, it may be determined not to perform direct data communication.

The first AP 301 may perform FTM on the straight line path between the first external electronic device 310 and the second external electronic device 320, thereby identifying the presence of an obstacle. The obstacle may include various electrical objects that may influence wireless communication, e.g., a moving person. According to an embodiment, where a returning signal is discovered within a given time as the result of performing FTM on the straight line path between the first external electronic device 310 and the second external electronic device 320 based on the distance from the first AP 301, the first AP 301 may determine that an obstacle 330 is present on the straight line path to disturb wireless communication. According to an embodiment, whether an LoS environment is established between the first external electronic device 310 and the second external electronic device 320 may be determined by the statistical properties of the channel. For example, the statistical properties of the channel may be determined based on, e.g., the kurtosis or skewness of the 2.4 GHz or 5 GHz channel. According to an embodiment, upon determining that there is an obstacle 330 between the first external electronic device 310 and the second external electronic device 320, the electronic device (e.g., the AP 301) may control the external electronic devices to perform data communication via the first AP 301 as shown in FIG. 5A or the second AP 302 as shown in FIG. 5C. Where the obstacle 330 exists, the first AP 301 may determine that LoS is not possible, and where LoS is impossible, despite the possibility of 60 GHz band wireless communication, the first AP 301 may control them to perform data communication using a frequency band other than the 60 GHz band.

Figure 13:
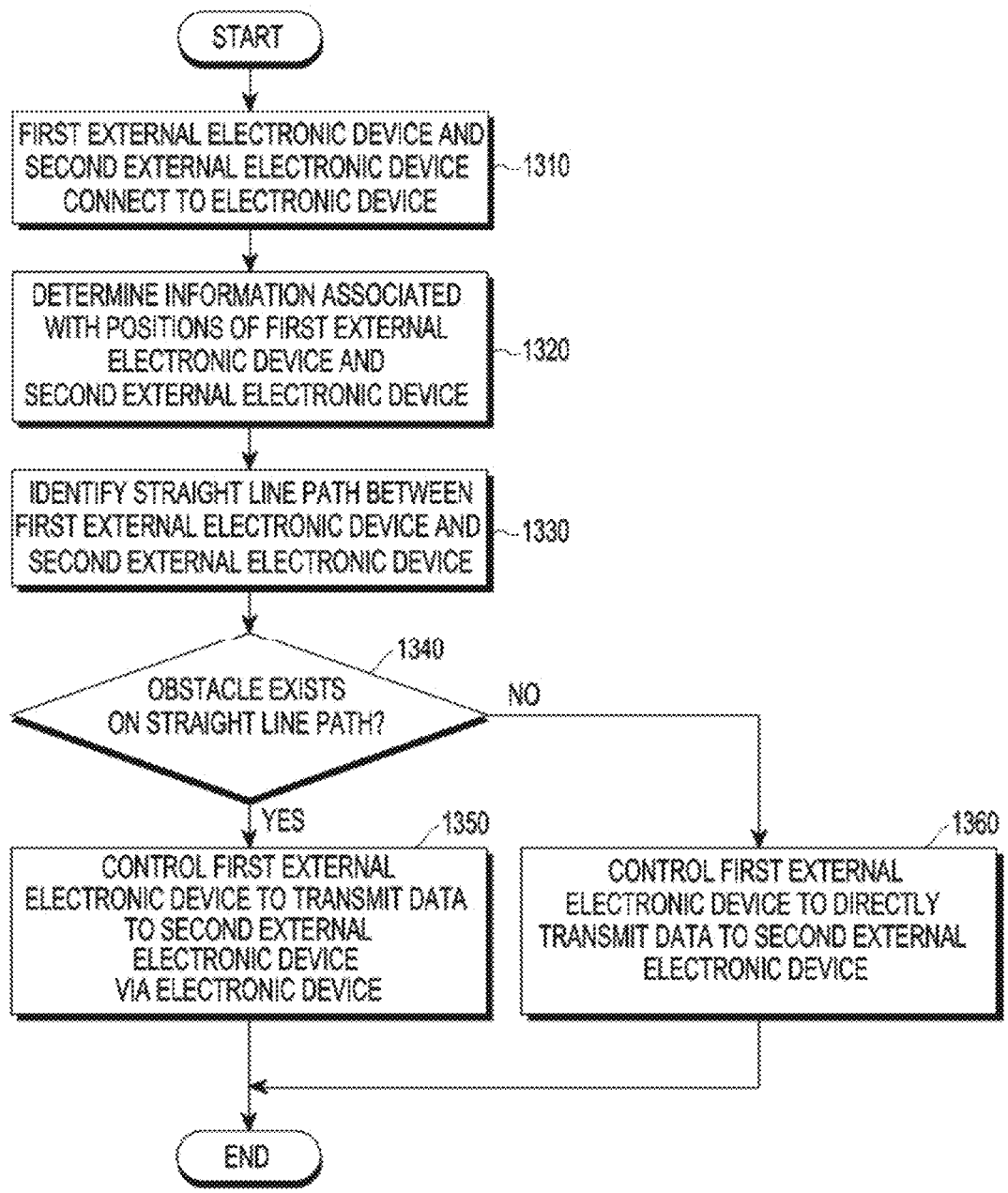
FIG. 13 is a flowchart illustrating a method for controlling, by an electronic device, data communication between external electronic devices considering an obstacle, according to an embodiment.

FIG. 13 is a flowchart illustrating a method for controlling, by an electronic device 201 (e.g., the first AP 301), data communication between external electronic devices considering an obstacle, according to an embodiment.

In operation 1310, a first external electronic device 310 and a second external electronic device 320 may connect to the electronic device (e.g., the AP 301). When a first wireless communication channel from the first external electronic device 310 is formed, and a second wireless communication channel from the second external electronic device 320 is formed, the electronic device (e.g., the AP 301) may detect the first external electronic device 310 and the second external electronic device 320 connecting to the electronic device (e.g., the AP 301) to perform data communication.

In operation 1320, the electronic device (e.g., the AP 301) may determine information associated with the positions of the first external electronic device 310 and the second external electronic device 320. According to the embodiments described above in connection with FIG. 3 and its subsequent figures, relative distances and directions between the first external electronic device 310 and second external electronic device 320 and the AP 301 may be estimated.

In operation 1330, the AP 301 may identify the straight line path between the first external electronic device 310 and the second external electronic device 320. For example, the straight line path may be positioned a predetermined distance away between the electronic device (e.g., the AP 301) and the first external electronic device 310 or second external electronic device 320 and may be positioned between the directions to the first external electronic device 310 and the second external electronic device 320.

In operation 1340, the electronic device (e.g., the AP 301) may identify whether there is an obstacle on the straight line path. The presence or absence of an obstacle may be identified by performing FTM on the straight line path to determine whether there is a returning signal from the straight line path or measuring the distance between the two devices, or by other various methods, according to an embodiment.

Upon determining that an obstacle 330 is present between the first external electronic device 310 and the second external electronic device 320, the electronic device (e.g., the AP 301) may, in operation 1350, control the first external electronic device 310 to transmit data to the second external electronic device 320 via the AP 301. Even predicting that 60 GHz wireless communication would have the highest data transmission rate between the first external electronic device 310 and the second external electronic device 320 given the supported frequency band and the distance between the first external electronic device 310 and the second external electronic device 320, if there is an obstacle 330 between the two devices performing data communication, direct connection may not enable data communication. In view of this, the data transmission path may be set up to allow the first external electronic device 310 and the second external electronic device 320 to perform data communication via the first wireless communication channel and second wireless communication channel, which have already been established, but rather than direct connection.

Upon determining that no obstacle exists between the first external electronic device 310 and the second external electronic device 320 in operation 1340, the electronic device (e.g., the AP 301) may, in operation 1360, control the first external electronic device 310 and the second external electronic device 320 to directly transmit data therebetween. Upon discovering an obstacle on the straight line path between the first external electronic device 310 and the second external electronic device 320 while direct wireless data communication is established between the first external electronic device 310 and the second external electronic device 320, the data transmission path between the first external electronic device 310 and the second external electronic device 320 needs to be changed. According to an embodiment, operation 1340 may be repeated at determined cycles while the first external electronic device 310 and the second external electronic device 320 are connected together for data communication, identifying whether an obstacle intervenes on the straight line path between the two devices. According to an embodiment, where the obstacle renders it difficult to perform data communication between the first external electronic device 310 and the second external electronic device 320, the first external electronic device 310 or the second external electronic device 320 may send a data transmission path request to the electronic device (e.g., the AP 301). In this case, the electronic device (e.g., the AP 301) may control the first external electronic device 310 to transmit data to the second external electronic device 320 via the electronic device (e.g., the AP 301) or another AP (e.g., the second AP 302).

As is apparent from the foregoing description, according to various embodiments, an electronic device may perform control so that a first external electronic device and a second external electronic device may directly connect to each other based on the distance between the first external electronic device and the second external electronic device.

According to various embodiments, the electronic device may perform control so that the first external electronic device and the second external electronic device may transmit data at high speed.

According to various embodiments, the electronic device may perform control so that the first external electronic device and the second external electronic device, which are connected to the electronic device, may connect together using different APs for the first external electronic device and the second external electronic device.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a network interface configured to connect to an internet;
a wireless communication circuit configured to support directional communication in a frequency band between 20 GHz to 100 GHz;
a processor electrically connected with the network interface and the wireless communication circuit; and
a memory electrically connected with the processor, wherein the memory stores instructions that, when executed by the processor, cause the processor to:
establish a first wireless communication channel with a first external electronic device using the wireless communication circuit,
establish a second wireless communication channel with a second external electronic device using the wireless communication circuit,
obtain information associated with positions of the first external electronic device and the second external electronic device,
detect communication, via the electronic device, between the first external electronic device and the second external electronic device based on receiving, from the first external electronic device, a data packet to be received by the second external electronic device,
enable the first external electronic device and the second external electronic device to directly connect to each other in the frequency band at least partially based on the information, and
based on a data transmission speed of the communication via the electronic device or a data transmission speed of direct communication between the first external electronic device and the second external electronic device, enable the first external electronic device and the second external electronic device to perform communication via another electronic device.

2. The electronic device of claim 1, wherein the obtained information comprises:
information regarding a direction and a distance of the first external electronic device from the electronic device, and
information regarding a direction and a distance of the second external electronic device from the electronic device.

3. The electronic device of claim 2, wherein the instructions, when executed by the processor, cause the processor to:
determine a distance between the first external electronic device and the second external electronic device, and
enable the first external electronic device and the second external electronic device to directly connect to each other at least partially based on the distance.

4. The electronic device of claim 1, wherein the frequency band includes 60 GHz.

5. The electronic device of claim 1, wherein the instructions, when executed by the processor, cause the processor to control the first external electronic device to transmit data to the second external electronic device via the wireless communication circuit or another electronic device.

6. The electronic device of claim 1, wherein the instructions, when executed by the processor, cause the processor to control data communication between the first external electronic device and the second external electronic device based on a data transmission rate as per a distance and a bandwidth.

7. The electronic device of claim 1, wherein the instructions, when executed by the processor, cause the processor to control data communication between the first external electronic device and the second external electronic device based on channel utilization of a bandwidth.

8. The electronic device of claim 1, wherein the instructions, when executed by the processor, cause the processor to control data communication between the first external electronic device and the second external electronic device based on a hop count for the electronic device.

9. The electronic device of claim 1, wherein the instructions, when executed by the processor, cause the processor to:
determine another electronic device that has a sum of distances smaller than a sum of distances (i) between the electronic device and the first external electronic device and (ii) between the electronic device and the second external electronic device, and
control the first external electronic device to transmit data to the second external electronic device via the another electronic device.

10. The electronic device of claim 1, wherein the instructions, when executed by the processor, cause the processor to:
obtain a first distance and a first angle between the electronic device and the first external electronic device using wireless communication of a 60 GHz frequency band,
obtain a second distance and a second angle between the electronic device and the second external electronic device using the wireless communication of the 60 GHz frequency band, and
determine a distance and an angle between the first external electronic device and the second external electronic device based on the first distance, the second distance, the first angle, and the second angle.

11. A non-transitory storage medium storing instructions that, when executed by at least one processor of an electronic device, cause the at least one processor to: establish a first wireless communication channel with a first external electronic device,
establish a second wireless communication channel with a second external electronic device,
obtain information associated with positions of the first external electronic device and the second external electronic device,
detect communication, via the electronic device, between the first external electronic device and the second external electronic device based on receiving, from the first external electronic device, a data packet to be received by the second external electronic device,
enable the first external electronic device and the second external electronic device to directly connect to each other using a frequency band at least partially based on the information,
based on a data transmission speed of the communication via the electronic device or a data transmission speed of direct communication between the first external electronic device and the second external electronic device, enable the first external electronic device and the second external electronic device to perform communication via another electronic device.

12. The non-transitory storage medium of claim 11, wherein the obtained information comprises:
information regarding a direction and a distance of the first external electronic device, and
information regarding a direction and a distance of the second external electronic device.

13. The non-transitory storage medium of claim 12, wherein the instructions, when executed by the at least one processor, cause the processor to:
determine a distance between the first external electronic device and the second external electronic device, and
enable the first external electronic device and the second external electronic device to directly connect to each other at least partially based on the distance.

14. The non-transitory storage medium of claim 11, wherein the frequency band includes 60 GHz.

15. The non-transitory storage medium of claim 11, wherein the instructions, when executed by the at least one processor, cause the at least one processor to:
identify first location information about at least one access point (AP) with respect to the first external electronic device based on location information about the at least one AP,
identify second location information about the at least one AP with respect to the second external electronic device based on the location information about the at least one AP,
select a first AP positioned closest to the first external electronic device and the second external electronic device at least partially based on the first location information and the second location information, and
enable the first external electronic device and the second external electronic device to connect to each other via a wireless communication circuit of the selected first AP.

* * * * *